United States Patent
Wang et al.

(10) Patent No.: US 9,927,543 B2
(45) Date of Patent: Mar. 27, 2018

(54) APPARATUS FOR MODE EXTRACTION USING MULTIPLE FREQUENCIES

(71) Applicant: Schlumberger Technology Corporation, Sugar Land, TX (US)

(72) Inventors: Pu Wang, Malden, MA (US); Sandip Bose, Brookline, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 14/908,530

(22) PCT Filed: Aug. 5, 2014

(86) PCT No.: PCT/US2014/049703
§ 371 (c)(1),
(2) Date: Jan. 28, 2016

(87) PCT Pub. No.: WO2015/021004
PCT Pub. Date: Feb. 12, 2015

(65) Prior Publication Data
US 2016/0209538 A1   Jul. 21, 2016

Related U.S. Application Data

(60) Provisional application No. 61/862,207, filed on Aug. 5, 2013.

(51) Int. Cl.
*G01V 1/48* (2006.01)
(52) U.S. Cl.
CPC ..................... *G01V 1/48* (2013.01)
(58) Field of Classification Search
CPC ........................................................ G01V 1/48
(Continued)

(56) References Cited

U.S. PATENT DOCUMENTS

2006/0235617 A1   10/2006  Sinha et al.
2007/0030761 A1   2/2007   Donald et al.
(Continued)

FOREIGN PATENT DOCUMENTS

WO   2005/006009   1/2005

OTHER PUBLICATIONS

S. Lang, A. Kurkjian, J. McClellan, C. Morris, and T. Parks, "Estimating slowness dispersion from arrays of sonic logging waveforms," Geophysics, vol. 52, No. 4, pp. 530-544, Apr. 1987.
(Continued)

*Primary Examiner* — Daniel L Murphy
(74) *Attorney, Agent, or Firm* — Trevor G. Grove

(57) ABSTRACT

An apparatus is provided for extracting slowness dispersion characteristics of sonic wave forms in broadband acoustic waves received by multiple sensors including means to digitize the sonic wave forms to form discrete time wave forms and converting the discrete time wave forms into frequency domain wave forms and means to divide a processing band of the wave forms into frequency sub-bands. For each sub-band approximating a family of candidate dispersion curves for multiple modes, parameterizing each of the curves by phase and group slowness, and forming a frequency dependent over-complete dictionary of basis elements, each corresponding to a pair of phase and group slownesses. In addition, forming multiple measurement vectors from the frequency domain data and implementing a sparse Bayesian learning (SBL) algorithm on the vectors with a block sparse signal model and outputting the results. Also, a means for generating a final dispersion curve.

13 Claims, 12 Drawing Sheets

(58) Field of Classification Search
USPC .......................................................... 367/32
See application file for complete search history.

(56) References Cited

U.S. PATENT DOCUMENTS

2007/0147251 A1    6/2007   Monsen
2013/0114376 A1    5/2013   Aeron et al.

OTHER PUBLICATIONS

M. P. Ekstrom, "Dispersion Estimation from Borehole Acoustic Arrays Using a Modified Matrix Pencil Algorithm," in Proceedings of 29th Asilomar Conf. Signals, Syst., Comput. vol. 2, Pacific Grove, CA, Nov. 1996, pp. 449-453.
B. Nolte, R. Rao, and X. Huang, "Dispersion Analysis of Split Flexural Waves," in MIT Annual Report of Borehole Acoustics and Logging and Reserior Delineation Consortia, Cambridge, MA, 1997.
H. Li, J. Li, and P. Stoica, "Performance Analysis of Forward-Backward Matched-Filterbank Spectral Estimators," IEEE Transactions on Signal Processing, vol. 46, No. 7, pp. 1954-1966, Jul. 1998.
P. Stoica, H. Li, and J. Li, "A New Derivation of the APES Filter," IEEE Signal Processing Letters, vol. 6, No. 8, pp. 205-206, Aug. 1999.
W. Li, G. Tao, C. Torres-Verdin, H. Wang, J. Ma, and C. Xu, "Enhanced dispersion analysis of borehole array sonic measurements with amplitude and phase estimation method," in SEG Technical Program Expanded Abstracts, 2012.
K. Hsu and C. Esmersoy, "Parametric estimation of phase and group slowness from sonic logging waveforms," Geophysics, vol. 57, No. 8, pp. 978-985, Aug. 1992.

A. Roueff, J. I. Mars, J. Chanussot, and H. Pedersen, "Dispersion Estimation From Linear Array Data in the Time-Frequency Plane," IEEE Trans. Signal Process., vol. 53, No. 10, pp. 3738-3748, Oct. 2005.
S. Aeron, S. Bose, H-P. Valero, and V. Saligrama, "Broadband Dispersion Extraction Using Simultaneous Sparse Penalization," IEEE Trans. on Signal Processing, vol. 59, No. 10, pp. 4821-4837, Oct. 2011.
M. E. Tipping, "Sparse Bayesian Learning and the Relevance Vector Machine," J. Mach. Learn. Res., vol. 1, pp. 211-244, Jun. 2001.
D. P. Wipf and B. Rao, "Sparse Bayesian Learning for Basis Selection," IEEE Transactions on Signal Processing, vol. 52, No. 8, pp. 2153-2164, Aug. 2004.
D.P. Wipf, and B.D. Rao, "An Empirical Bayesian Strategy for Solving the Simultaneous Sparse Approximation Problem," IEEE Transactions on Signal Processing, vol. 55, No. 7, pp. 3704-3716, Jul. 2007.
Z. Zhang and B. D. Rao, "Sparse Signal Recovery With Temporally Correlated Source Vectors Using Sparse Bayesian Learning," IEEE Journal of Selected Topics Signal Processing, vol. 5, No. 5, pp. 912-926, May 2011.
Y. C. Eldar and M. Mishali, "Robust Recovery of Signals from a Structured Union of Subspaces," IEEE Transactions on Information Theory, vol. 55, No. 11, pp. 5302-5316, Nov. 2009.
A. P. Dempster, N. M. Laird, and D. Rubin, "Maximum Likelihood from Incomplete Data via the EM Algorithm," Journal of the Royal Statistical Society: Series B, vol. 39, No. 1, pp. 1-38, Nov. 1977.
K. Hsu and A. B. Baggeroer, "Application of the Maximum Likelihood Method (MLM) for Sonic Velocity Logging," Geophysics, vol. 51, No. 3, pp. 780-787, Mar. 1986.
International Search Report and Written Opinion issued in the related PCT application PCT/US2014/049703, dated Nov. 14, 2014 (9 pages).
International Preliminary Report on Patentability issued in the related PCT application PCT/US2014/049703, dated Feb. 9, 2016 (5 pages).

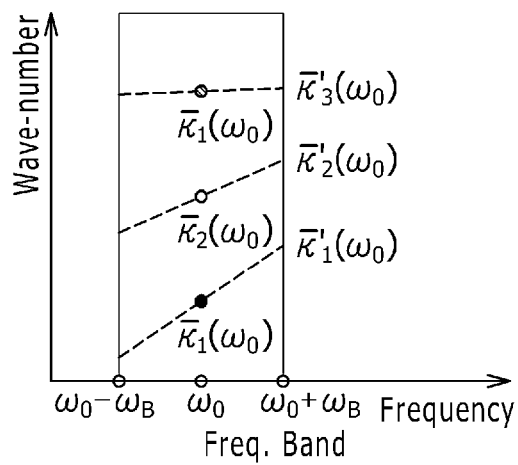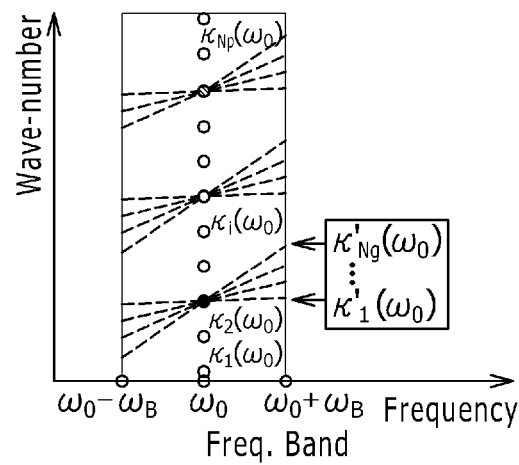

Noisy Multi-Mode RZX Waveform
(SNR=20dB)

Average Spectrum of Noisy RZX Data
(SNR=20dB)

Matrix Pencil
(RZX, p=4, tol=40, SNR=20dB)

M-Lasso
(KS-Test, RZX, SNR=20dB, P=4)

SBL-FP
(RZX, SNR=20dB, P=4)

SBL-FP
(RZX, SNR=20dB, P=4)

Corr-SBL-FP, Global Estimates,
(RZX, SNR=20dB, P=4)

Corr-SBL-FP, Local Estimates,
(RZX, SNR=20dB, P=4)

Noisy Multi-Mode RZX Waveform
(SNR=0dB)

Average Spectrum of Noisy RZX Data
(SNR=0dB)

Matrix Pencil
(RZX, p=4, tol=40, SNR=0dB)

M-Lasso
(KS-Test, RZX, SNR=0dB, P=4)

SBL-FP
(RZX, SNR=0dB, P=4)

SBL-FP
(RZX, SNR=0dB, P=4)

Corr-SBL-FP, Global Estimates,
(RZX, SNR=0dB, P=4)

Corr-SBL-FP, Local Estimates,
(RZX, SNR=0dB, P=4)

Waveforms (FJ009, D2, DIIN), Depth=12906.4 ft

Mtrix Pencil (FJ009, D2, Frame=200, P=4, tol=40)

SBL-FP, Global Estimates, (FJ009, D2, Frame=200, P=4)

SBL-FP, Global Estimates, (FJ009, D2, Frame=200, P=4)

Corr-SBL-FP, Global Estimates, (FJ009, D2, Frame=200, P=4)

Corr-SBL-FP, Local Estimates, (FJ009, D2, Frame=200, P=4)

APPARATUS FOR MODE EXTRACTION USING MULTIPLE FREQUENCIES

RELATED APPLICATIONS

This application claims the benefit of a related U.S. Provisional Application Ser. No. 61/862,207 filed Aug. 5, 2013, entitled "SPARSE BAYESIAN EXTRACTION OF BOREHOLE ACOUSTIC DISPERSIONS," to Pu WANG, et al., the disclosure of which is incorporated by reference herein in its entirety.

BACKGROUND

The following descriptions and examples are not admitted to be prior art by virtue of their inclusion in this section.

Acoustic waves in fluid-filled boreholes may be excited and recorded from sonic logging tools. Their propagation in the borehole is affected by the type of surrounding rocks. More specifically, non-dispersive acoustic waves have been observed such as P- and S-headwaves, and dispersive waves such as Stoneley and pseudo-Rayleigh waves in monopole logging and flexural waves in dipole logging. In contrast to the constant slowness at all frequencies for the non-dispersive modes, the dispersive waves exhibit varied phase and group slownesses at different frequencies. Analysis and estimation of the slowness and its change over the frequency (i.e., the dispersion) provide important information to infer the properties of surrounding formation. For example, the compressional and shear slownesses have been used for reservoir characterizations and radial profiling of near-wellbore formation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In accordance with one embodiment, an apparatus is provided for extracting slowness dispersion characteristics of one or more sonic wave forms in broadband acoustic waves received by an array of two or more sensors. The apparatus includes means for digitizing the sonic wave forms to form discrete time wave forms and converting the discrete time wave forms into frequency domain wave forms and means for dividing a processing band of the frequency domain wave forms into frequency sub-bands. For each sub-band, approximating a family of candidate dispersion curves for multiple modes, parameterizing each of the family of approximated candidate dispersion curves by phase and group slowness, and forming a frequency dependent over-complete dictionary of basis elements, each corresponding to a pair of phase and group slownesses, and spanning a range of values thereof. In addition, for each sub-band forming multiple measurement vectors from the frequency domain data, and implementing a sparse Bayesian learning (SBL) algorithm on the multiple measurement vectors with a block sparse signal model.

SLB is implemented by estimating a mode spectrum amplitude with a Bayesian approach, estimating a mode spectrum variance, noise variance and other model parameters with a maximum likelihood estimation, and optionally utilizing spectrum correlation patterns of multiple modes. In addition, pruning mode candidates by comparing the estimated mode parameters with a threshold, iterating between the Bayesian approach and the maximum likelihood estimation until convergence according to a criterion, and outputting the phase and group slowness and the mode spectrum amplitude for the given sub-band. The apparatus further includes means for generating a final dispersion curve over the processing frequency band.

Other or alternative features will become apparent from the following description, from the drawings, and from the claims.

BRIEF DESCRIPTION OF THE DRAWINGS

Certain embodiments will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows:

FIGS. 4A & 4B are graphic representations of an overcomplete representation of all possible acoustic modes in a chosen frequency band wherein 4A illustrates three modes and 4B illustrates an overcomplete representation.

DETAILED DESCRIPTION

Figure 1A:
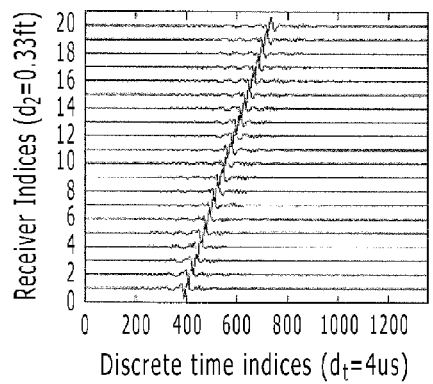
FIG. 1A is a graphic representation of time-domain borehole acoustic waveforms.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present disclosure. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

As used throughout the specification and claims, the term "downhole" refers to a subterranean environment, particularly in a wellbore. "Downhole tool" is used broadly to mean any tool used in a subterranean environment including, but not limited to, a logging tool, an imaging tool, an acoustic tool, a permanent monitoring tool, and a combination tool. The various techniques disclosed herein may be utilized to facilitate and improve data acquisition and analysis in downhole tools and systems. In this, downhole tools and systems are provided that utilize arrays of sensing devices that are configured or designed for easy attachment and detachment in downhole sensor tools or modules that are deployed for purposes of sensing data relating to environmental and tool parameters downhole, within a borehole. The tools and sensing systems disclosed herein may effectively sense and store characteristics relating to components of downhole tools as well as formation parameters at elevated temperatures and pressures. The sensing systems herein may be incorporated in tool systems such as wireline logging tools, measurement-while-drilling and logging-while-drilling tools, permanent monitoring systems, drill bits, drill collars, sondes, among others. For purposes of this disclosure, when any one of the terms wireline, cable line, slickline or coiled tubing or conveyance is used it is understood that any of the referenced deployment means, or any other suitable equivalent means, may be used with the present disclosure without departing from the spirit and scope of the present disclosure.

Moreover, inventive aspects lie in less than all features of a single disclosed embodiment. Thus, the claims following the Detailed Description are hereby expressly incorporated into this Detailed Description, with each claim standing on its own as a separate embodiment.

A method is proposed for extraction of multiple strong/weak borehole acoustic modes (possibly overlapping over the time and/or frequency domains) including both the dispersion characteristic (slowness or wavenumber as a function of frequency) and the wavetrains by processing acoustic array waveforms at multiple frequency points simultaneously. This broadband dispersion analysis is achieved by first formulating it as the basis selection with an overcomplete dictionary and then deriving the solution by exploiting the mode sparsity through the framework of sparse Bayesian learning (SBL). Specifically, two SBL methods, the broadband SBL method and the broadband Corr-SBL method, are proposed for the purpose of acoustic dispersion extraction. The broadband Corr-SBL method is proposed to not only utilize the mode sparsity, but also to learn multiple spectrum correlation patterns across frequency in each mode. In the case of no spectrum correlation, the broadband SBL method enables a fast, iterative solution to extract multiple acoustic modes.

For a given frequency band, the two broadband SBL methods are featured by 1) the ability to utilize the sparsity of acoustic modes, 2) a simple and iterative implementation, and 3) no intervention of user-parameters. To obtain a global dispersion analysis, two workflow procedures, either producing the slowness estimation locally or estimating the slowness from a global fitness function, are proposed to extract the multiple acoustic dispersion curves.

Acoustic waves in fluid-filled boreholes may be excited and recorded from sonic logging tools. Sonic generally referring to frequencies and tools opereated in, but not limited to, a frequency range of about 1 to 25 kilohertz. Embodiments herein relate to the processing of acoustic waveforms specifically those with dispersion, i.e. a dependence of wave speed with frequency. This has applications to the processing of borehole acoustic data, dominated by dispersive borehole modes, using logging-while-drilling (LWD) and wireline tools but could also be used in other situations where dispersion exists and needs to be estimated. These can then be used to extract information of interest such as rock compressional and shear velocities, radial variation, anisotropy, etc. In some embodiments, a method is described to estimate the dispersion characteristics of multiple propagating modes that overlap in the time and/or frequency domains using an array of two or more sensors.

Embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Figure 1B:
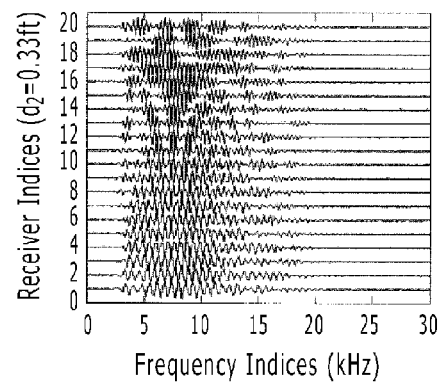
FIG. 1B is a graphic representation of frequency-domain borehole acoustic waveforms, only the real parts are illustrated in the FIG.

Over the past two decades, both narrowband and broadband approaches have been proposed to estimate the slowness for the non-dispersive and dispersive modes. These frequency-based methods first digitize the recorded acoustic waveforms (see FIG. 1A for an illustration of synthetic borehole waveforms), convert the discrete time waveforms to the frequency domain with the fast Fourier transform (see FIG. 1B), and then process the frequency-domain waveforms for the estimation of slowness and its dispersion.

Figure 1C:
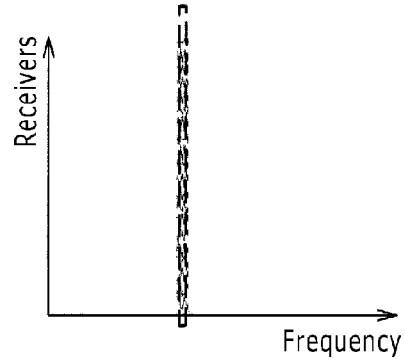
FIG. 1C is a graphic representation of the narrowband (frequency) method.

Within the narrowband framework, the slowness is estimated independently from one frequency to another. As illustrated in FIG. 1C (with some exaggeration), the narrowband method only processes the frequency-domain waveforms at a particular frequency point (within the small window) at a time, and then proceeds the processing at the next adjacent frequency point. Prony's method and the modified matrix pencil method (MP, also referred to as the TKO method in the industry) belong to this category. Specifically, these two methods are based on a parametric assumption that the borehole acoustic mode at a given frequency can be modeled as the superposition of multiple exponential functions. Although computationally efficient, these two methods are sensitive to a preset mode number and, hence, suffer from either spurious slowness estimation with an over-estimated mode number or suppression of a weak mode with an under-estimated mode number. Such performance sensitivity to the preset mode number exists even in the noise-free case and can be amplified in the noise case. The narrowband maximum-likelihood (ML) method or, equivalently, the Capon beamforming, was modified for sonic logging. The idea is to keep the mode at a given slowness undistorted, while suppressing the noise and modes at other wavenumbers. However, a spectral averaging operation of the narrowband ML method usually causes poor slowness estimation due to the unstable covariance matrix estimation averaged over non-stationary signals from adjacent frequency points.

Meanwhile, non-parametric narrowband methods were introduced in the borehole acoustic analysis without the parametric assumption. A coherency maximization method was proposed that can only identify one mode (the strongest one) at a given frequency. More recently, the amplitude and phase estimation (APES) method was promoted for the dispersion analysis of borehole acoustic modes. APES first computes the qualitative fitness function over the slowness domain at a given frequency and then uses a peak finding algorithm with a preset peak/mode number to obtain the quantitative slowness estimates. Similar to the MP method, the narrowband APES method is sensitive to the preset mode number.

Figure 1D:
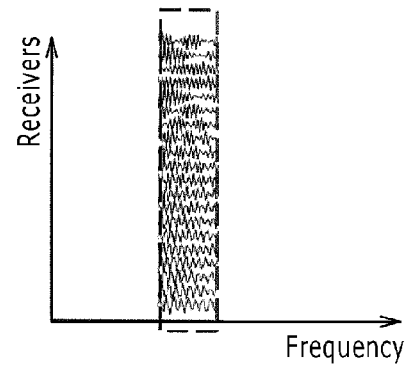
FIG. 1D is a graphic representation of the broadband (frequency) method.

Conversely, the broadband approach collects the array data from a chosen frequency band (as in the large window of FIG. 1D), instead of a single frequency point, and simultaneously estimates the phase and group slownesses from the broadband array data. With more data processed at a time, the broadband approach is able to deliver smooth slowness estimates with small fluctuations from one frequency to another, high-resolution slowness estimates, and robust performance at low signal-to-noise ratio (SNR).

Another broadband technique was recently proposed that uses the $l_1$ norm, together with the $l_2$ fitting criterion, to regularize the slowness estimates towards a sparse solution. Specifically, the group LASSO method was used to solve the hybrid $l_1/l_2$ optimization problem. However, group LASSOs use for the acoustic mode extraction may be limited due to a) the demanding complexity, and b) the selection of a regularization parameter that controls the trade-off between the $l_2$ fitting residuals and the solution sparsity. Regarding issue a), even with a properly chosen regularization parameter the group LASSO method solved by the second-order cone program (SOCP) implementation or the interior-point (IP) method tends to be slow in a high dimensional setup even with a state-of-art numerical solver. Issue a) is further escalated when one has to address issue b). For issue b), one may use the L-curve method, the cross-validation method, and the Kolmogorov-Smirnov (KS) procedure. For each of these methods, multiple start-over runs of the entire group LASSO method are required and this significantly increases the computational burden. An improper regularization parameter determined by the KS test may result in either spurious estimates or suppression of weak modes, similar to the effect caused by an improper mode number when used in the narrowband approach.

Some embodiments of this disclosure reformulate the problem of interest in a block sparse signal model with varying overcomplete dictionaries propagating along the columns, and propose a generalized sparse Bayesian learning (SBL) method for the application-specified block sparse model. For a given frequency band, an embodiment incorporating the resulting SBL method is able to extract the slowness from the broadband array data in a fully automatic, user-parameter free way, without any specification of the mode number and/or the regularization parameter.

To obtain the overall dispersion analysis, various embodiments of both global and local workflow procedures are described herein. During this part of the procedure, a limited number of algorithm parameters are introduced such as the number of frequency point in a frequency band, the overlapping ratio between two consecutive frequency bands, and the mode number. By exploiting the mode sparsity, the workflow produces smoother slowness estimates with less fluctuation, less spurious estimates, and better capability to extract weak modes. Besides the performance improvement, the described SBL method provides less computational complexity than the broadband ML method or the the group LASSO method.

In an exemplary embodiment, to begin the signal model a conventional space-frequency model of the recorded array waveform from L receivers in an acoustic logging tool is used:

$$y_l(\omega) = \sum_{p=1}^{P} \bar{a}_p(\omega) e^{j\bar{k}_p(\omega) z_l} + v_n(\omega), l = 1, 2, \ldots, L \tag{1}$$

where $y_l(\omega)$ is the frequency spectrum of the recorded waveform at the l-th receiver at a given angular frequency $\omega$, P is the number of modes at frequency $\omega$, $\bar{a}_p(\omega)$ and $\bar{k}_p(\omega)$ are the true but unknown spectrum amplitude and wavenumber of the p-th mode, $z_l$ is the distance from the source (or a reference point) to the l-th receiver, and $v_n(\omega)$ is the complex white Gaussian noise with zero mean and variance $\sigma^2$.

Figure 14:
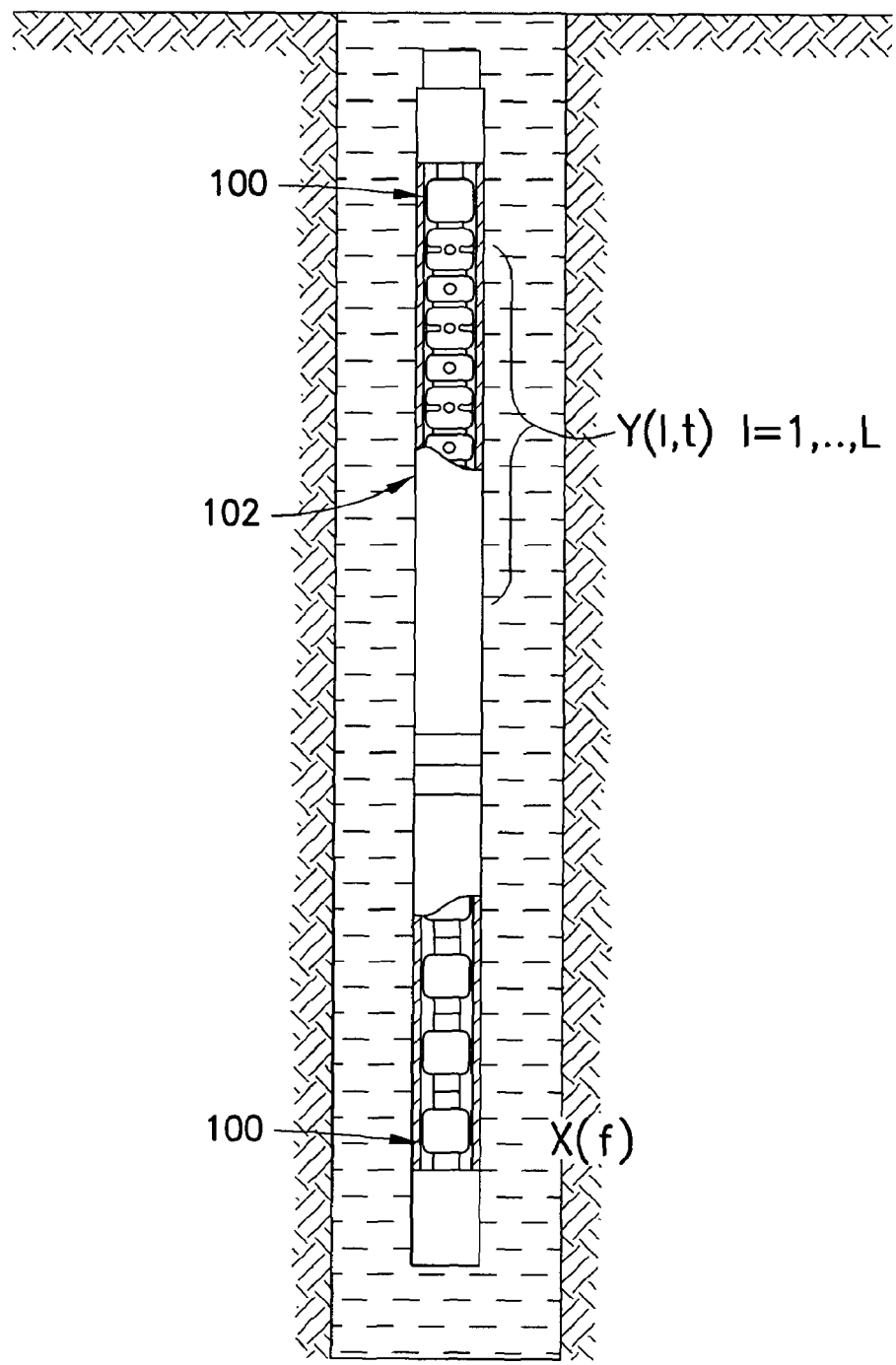
FIG. 14 is a schematic representation of a physical set-up for acquisition of waves in a borehole.

An example of an acoustic logging tool is shown in FIG. 14. An acoustic source (100) which may be in communication with surface equipment is fired in a fluid filled borehole and the resulting waves that are generated in the borehole are recorded at a linear array of sonic sensors (e.g., hydrophones) (102) located on the acoustic tool.

Figure 2:
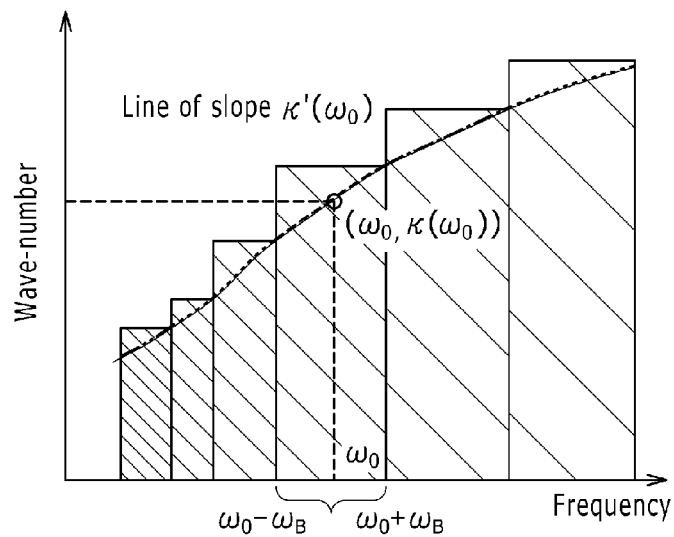
FIG. 2 is a graphic representation of wave-number vs. frequency using the broadband (frequency) method.

As illustrated in an exemplary embodiment shown in FIG. 2, the broadband approach usually divides the whole frequency domain into successive (overlapping and/or non-overlapping) frequency bands (illustrated as separate columns) and estimates the slowness for one frequency band by jointly processing the frequency-domain waveforms within that frequency band. A global estimate of the slowness of various acoustic modes can then be obtained by putting together the slowness estimates from different frequency bands. For the convenience of description, the following will focus on a slowness estimation over a particular frequency band as an exemplary process. An embodiment of the workflow for a global estimate of slowness will be considered later.

As an example describing a given frequency band, e.g., $\Omega = \{\omega_0 - \omega_B \leq \omega \leq \omega_0 + \omega_B\}$ with the one-side bandwidth $\omega_B$ and the center frequency $\omega_0$, a first-order Taylor series expansion of the wavenumber $\bar{k}_p(\omega)$ is used for the purpose of joint processing the array waveforms $\{y_l(\omega)\}_{l=1}^L$ within the chosen band $\Omega$. That is, specifically, $$\bar{k}_p(\omega) \approx \bar{k}_p(\omega_0) + \bar{k}'_p(\omega_0)(\omega - \omega_0), \text{ for all } \omega \in \Omega;$$
$$p = 1, \ldots, P \tag{2}$$

where $\bar{k}_p(\omega_0)$ and $\bar{k}'_p(\omega_0)$ denote the wavenumber and its first-order derivative of the p-th mode at the center frequency $\omega_0$. Taking (2) to (1) yields $$y_l(\omega) = \sum_{p=1}^{P} \bar{a}_p(\omega) e^{j\bar{s}_p(\omega_0)\omega_0 z_l} e^{j\bar{g}_p(\omega_0)(\omega-\omega_0)z_l} + v_n(\omega), \tag{3}$$

$$l = 1, 2, \ldots, L,$$

where, by convention, $\bar{k}_p(\omega_0)$ and $\bar{k}'_p(\omega_0)$ are one-to-one mapped to the pair of the phase and group slownesses, $(\bar{s}_p(\omega_0), \bar{g}_p(\omega_0))$, at the center frequency $\omega_0$:

$$\begin{bmatrix} \bar{s}_p \\ \bar{g}_p \end{bmatrix} = \begin{bmatrix} \omega_0^{-1} & 0 \\ 0 & 1 \end{bmatrix} \begin{bmatrix} \bar{k}_p \\ \bar{k}'_p \end{bmatrix} \tag{4}$$

where the dependence of $\bar{s}_p$ and $\bar{g}_p$ on $\omega_0$ is skipped for notational simplicity. Finally, since the slowness is defined as the ratio of wavenumber over the frequency, $$\bar{s}_p(\omega) = \frac{\bar{k}_p(\omega)}{\omega}$$

$$= \bar{s}_p + \bar{g}_p(1 - \omega_0/\omega), \text{ for all } \omega \in \Omega. \tag{5}$$

Figure 3A:
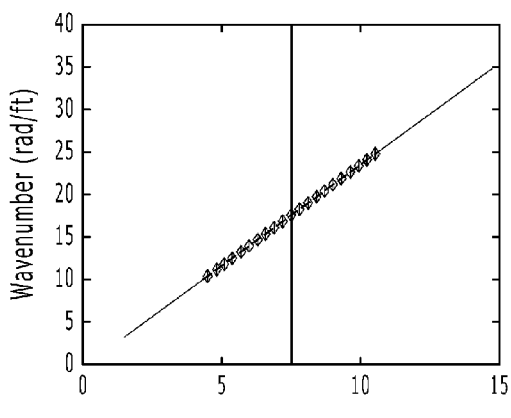
FIG. 3A is a graphic representation of wave-number vs. frequency using local approximation in the f-k (frequency-wavenumber) domain.
Figure 3B:
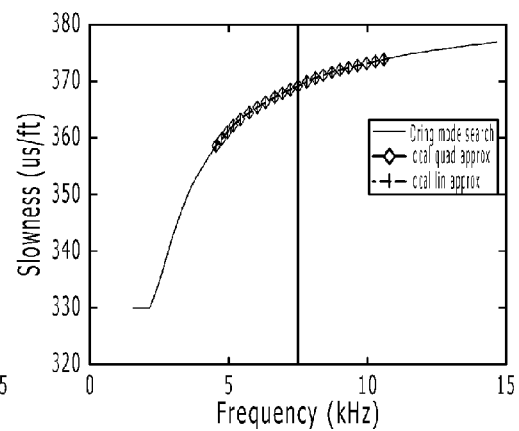
FIG. 3B is a graphic representation of slowness vs. frequency using local approximation in the f-s (frequency-slowness) domain.

The local wavenumber approximation in (2) states that each dispersion curve in the wavenumber-frequency domain can be uniquely determined by its wavenumber $k(\omega_0)$ and its slope $k'(\omega_0)$ at the center frequency $\omega_0$ of the chosen frequency band; see FIG. 2 for an exemplary illustration where the solid line denotes the true dispersion curve, while the dash/dotted straightlines are the locally first-order approximated dispersion curves over different frequency bands. Alternatively, the dispersion curve in the slowness-frequency domain is uniquely determined by the phase slowness $s_p$ and the group slowness $g_p$ at the center frequency $\omega_0$ over a particular frequency band due to (5). FIGS. 3A and 3B illustrate the equivalent dependence of dispersion curves in two different domains over two different sets of parameters defined at the center frequency.

FIG. 3A illustrates that the dispersion curves are locally approximated by straightlines over the wavenumber-frequency domain, while the dispersion curves in the slowness-frequency domain are approximated by smooth curves determined by $(s_p, g_p)$ as shown in FIG. 3B. FIGS. 3A and 3B also include a second-order quadratic approximation of the dispersion curve in both domains.

Stacking the frequency data from all L receivers at a given frequency $\omega \in \Omega$ into a column vector, $$y(\omega) = [y_1(\omega), y_2(\omega), \ldots, y_L(\omega)]^T, \omega \in \Omega, \tag{6}$$

and defining the dictionary as $$\Phi_P(\omega) = [\phi_1(\omega), \phi_2(\omega), \ldots, \phi_P(\omega)], \tag{7}$$

with $$\varphi_p(\omega) = \begin{bmatrix} e^{j[\omega_0 \bar{s}_p + (\omega-\omega_0)\bar{g}_p]z_1} \\ e^{j[\omega_0 \bar{s}_p + (\omega-\omega_0)\bar{g}_p]z_2} \\ \vdots \\ e^{j[\omega_0 \bar{s}_p + (\omega-\omega_0)\bar{g}_p]z_L} \end{bmatrix}, \tag{8}$$

we have the following signal model from (3)

$$y(\omega) = \Phi_P(\omega) a(\omega) + v(\omega), \omega \in \Omega \tag{9}$$

where $a(\Omega)$ is a P×1 spectrum amplitude vector and $v(\omega)$ is an L×1 observed noise vector at each frequency points within $\Omega$ $$a(\omega) = [\bar{a}_1(\omega), \bar{a}_2(\omega), \ldots, \bar{a}_P(\omega)]^T, \omega \in \Omega, \tag{10}$$

$$v(\omega) = [v_1(\omega), v_2(\omega), \ldots, v_L(\omega)]^T, \omega \in \Omega. \tag{11}$$

Mathematically, the signal model of (9) represents the P acoustic modes with P bases $\{\varphi_p(\omega)\}_{p=1}^P$ (i.e., the column vectors of $\Phi_P(\omega)$), each parametrized by the true but unknown $\{\bar{s}_p, \bar{g}_p\}$ in (8). Geometrically, this is illustrated in FIG. 4A, where P=3 acoustic modes over the chosen $\Omega$ are represented by three straightlines (equivalent to the bases $\{\varphi_p(\omega)\}_{p=1}^3$) in the wavenumber-frequency domain, each determined by its center and slope $\{\bar{k}_p(\omega), \bar{k}'_p(\omega)\}$ at the center frequency $\omega_0$. FIG. 4B illustrates an overcomplete representation of all possible modes in the frequency band.

From (9), it is seen that the broadband data $y(\omega), \omega \in \Omega$, are nonlinear with respect to the unknown parameters $\{\bar{s}_p, \bar{g}_p\}$. Therefore, traditional broadband methods such as the broadband ML method tend to use a multi-dimensional nonlinear optimization to first find the estimates of $\{\bar{s}_p, \bar{g}_p\}$, and then use these estimates to obtain the estimates of the spectrum amplitude $\bar{a}_p$. The dimension of the nonlinear optimization depends on the mode number P, which is not a priori. As a result, the implementation of the ML estimation requires a pre-specified mode number or an estimate of mode number from an order-determination method.

The broadband dispersion extraction can be reformulated in a block sparse signal model with varying dictionaries, which extends the sparse signal model. Specifically, one can express the broadband array waveforms in an overcomplete dictionary consisting of N>>P basis vectors parametrized by a pre-determined set of $(s_p, g_p)$. Mathematically, $$y(\omega) = \Phi(\omega) a(\omega) + v(\omega), \quad \omega \in \Omega \tag{12}$$

where $a(\omega) = [a_1(\omega), a_2(\omega), \ldots, a_N(\omega)]^T$ is an N×1 spectrum amplitude vector, and the dictionary $\Phi(\omega)$ is expanded from P basis vectors with unknown $(\bar{s}_p, \bar{g}_p)$ to N basis vectors with N pre-determined $(s_i, g_j)$ $$\Phi(\omega) = [\varphi_1(\omega), \varphi_2(\omega), \ldots, \varphi_N(\omega)], \tag{13}$$

with the n-th basis defined as $$\varphi_n(\omega) = \begin{bmatrix} e^{j[\omega_0 s_i + (\omega - \omega_0) g_j] z_1} \\ e^{j[\omega_0 s_i + (\omega - \omega_0) g_j] z_2} \\ \vdots \\ e^{j[\omega_0 s_i + (\omega - \omega_0) g_j] z_L} \end{bmatrix}, \tag{14}$$

corresponding to the (i,j) pre-determined $\{s_i, g_j\}$ $$i = \lceil n/N_g \rceil, \quad j = n - (i-1) N_g, \quad n = 1, 2, \ldots, N, \tag{15}$$

where $\lceil \cdot \rceil$ denotes the ceiling function.

To take into account the spectrum correlation, i.e., the mode spectrum correlation of $a(\omega)$ across the frequency points $\omega$, (12) is further rewritten under the block sparse signal model. First defining $$y_l \in \mathbb{C}^{F \times 1} = [y_l(\omega_1), y_l(\omega_2), \ldots, y_l(\omega_F)]^T, \tag{16}$$

$$a_n \in \mathbb{C}^{F \times 1} = [a_n(\omega_1), a_n(\omega_2), \ldots, a_n(\omega_F)]^T, \tag{17}$$

which, at the l-th receiver, collects the recorded data and the n-th mode spectrum amplitudes from F frequency points. Accordingly, F frequency-varying dictionaries $\Phi(\omega)$ are consolidated into a single dictionary as $$\Phi \in \mathbb{C}^{LF \times NF} = \begin{bmatrix} \Phi_{11} & \Phi_{12} & \cdots & \Phi_{1N} \\ \Phi_{21} & \Phi_{22} & \cdots & \Phi_{2N} \\ \vdots & \vdots & \ddots & \vdots \\ \Phi_{L1} & \Phi_{L2} & \cdots & \Phi_{LN} \end{bmatrix} \tag{18}$$

where the (l,n)-th block matrix given by $$\Phi_{ln} \in \mathbb{C}^{F \times F} = \begin{bmatrix} \Phi_{ln}(\omega_1) & 0 & 0 & \cdots & 0 \\ 0 & \Phi_{ln}(\omega_2) & 0 & \cdots & 0 \\ 0 & 0 & \Phi_{ln}(\omega_3) & \cdots & 0 \\ \vdots & \vdots & \vdots & \ddots & \vdots \\ 0 & 0 & 0 & \cdots & \Phi_{ln}(\omega_F) \end{bmatrix} \tag{19}$$

has the (l,n)-th elements of $\{\Phi(\omega_f)\}_{f=1}^F$ at its diagonal elements. With the new definitions of $$y \in \mathbb{C}^{LF \times 1} = [y_1^T, y_2^T, \ldots, y_L^T]^T, \tag{20}$$

$$a \in \mathbb{C}^{NF \times 1} = [a_1^T, a_2^T, \ldots, a_N^T]^T, \tag{21}$$

the signal model in (12) can be rewritten as $$y = \Phi a + v, \tag{22}$$

where a is assumed to have the block sparsity; that is only a few blocks $a_n \in \mathbb{C}^{F \times 1}$ have non-zero values. From the Bayesian viewpoint, we assume that each block in a, i.e., $a_n$, are complex Gaussian distributed with zero mean and covariance matrix $R_n$, $$a_n; \gamma_n, \Sigma : \mathcal{CN}(0, R_n), \tag{23}$$

where $R_n = \gamma_n \Sigma_n$. Explicitly, $\gamma_n$ controls the presence of the n-th basis/acoustic mode in the array data. If $\gamma_n = 0$, $a_n = 0$ in probability one and, hence, the n-th basis vector (or, equivalently, the n-th block column of $\Phi$, i.e., $\{\Phi_{ln}\}_{l=1}^L$) is excluded from the dictionary. Meanwhile, $\Sigma_n$ captures the mode spectrum correlation patterns of the n-th acoustic mode. In the case of no spectrum correlation, there is simply $\Sigma_1 = \ldots = \Sigma_N = I$. To remove the ambiguity between $\gamma_n$ and $\Sigma_n$, assume that $$tr\{\Sigma_n\} = F. \tag{24}$$

(23) is equivalent to having $$a; \gamma, \Sigma : \mathcal{CN}(0, R), \tag{25}$$

where $$\begin{aligned}
R &= \begin{bmatrix} R_1 & 0 & 0 & \cdots & 0 \\ 0 & R_2 & 0 & \cdots & 0 \\ 0 & 0 & R_3 & \cdots & 0 \\ \vdots & \vdots & \vdots & \ddots & \vdots \\ 0 & 0 & 0 & \cdots & R_n \end{bmatrix} \\
&= \begin{bmatrix} \gamma_1 \Sigma_1 & 0 & 0 & \cdots & 0 \\ 0 & \gamma_2 \Sigma_2 & 0 & \cdots & 0 \\ 0 & 0 & \gamma_3 \Sigma_3 & \cdots & 0 \\ \vdots & \vdots & \vdots & \ddots & \vdots \\ 0 & 0 & 0 & \cdots & \gamma_N \Sigma_N \end{bmatrix}
\end{aligned} \tag{26}$$

and $\Gamma = \text{diag}[\gamma] = \text{diag}[\gamma_1, \gamma_2, \ldots, \gamma_N]$. The noise vector is assumed to be complex Gaussian distributed with zero mean and variance $\sigma^2$, i.e., $$v; \sigma^2 : \mathcal{CN}(0, \sigma^2 I_{LF}), \tag{27}$$

where $I_{LF}$ denotes the identity matrix with dimension LF. It can be seen that the application-specified block sparse model introduced herein is different from the block sparse model with a Kronecker structure of $\Phi$, which also considers the spectrum correlation. Specifically, the block sparse model considered assumes a fixed dictionary across multiple measurement vectors, while, for the broadband acoustic dispersion extraction, the design of varying dictionaries for multiple frequency measurements is necessary to utilize the row sparsity. If no spectrum correlation is considered, i.e., $\Sigma_n = I$, the block sparse signal model (23) reduces to the multiple measurement vector (MMV) model with multiple dictionaries $\{\Phi(\omega_f)\}_{f=1}^F$ in (12), which includes the single measurement vector (SMV) model and the MMV model with a fixed dictionary $\Phi(\omega_1) = \ldots = \Phi(\omega_F)$ as special cases. Therefore, the proposed SBL methods can be applied to other applications such as time-varying direction-of-arrival (DOA) estimation where the dictionaries along the time domain need to be different to take into account the evolution of the DOA.

In determining new algorithms for slowness estimation for a given frequency band, the broadband Corr-SBL method is initially derived by taking into account the mode sparsity and the mode spectrum correlation. The method is derived in a two-step procedure: Step I) conditioned on the hyperparameters ($\gamma$ and $\Sigma$) and the noise variance $\sigma^2$, the Bayesian minimum mean square error (MMSE) estimate of the spectrum amplitude vector a is first obtained; Step II) the hyperparameters and noise variance are then estimated based on the Type-II maximum likelihood estimation. Particularly, the FP and EM iteration is used for the Type-II maximum likelihood estimation. Alternating these two steps gives the iterative, fully automatic, user-parameter free broadband Corr-SBL method for acoustic dispersion extraction for a particular frequency band.

Previously, the special case of $\Sigma_n = I$ was considered and this demonstrated the broadband Corr-SBL method reducing to the broadband SBL method. The resulting broadband SBL method generalizes the current SBL methods for the SMV model and the MMV model with a fixed dictionary by allowing varying dictionaries for each measurement.

Given the above signal model and conditioned on a and $\sigma^2$, the likelihood function of the observed data can be shown as $$y|a;\sigma^2 : CN(\Phi a, \sigma^2 I_{LF}). \quad (28)$$

By applying the Bayes' rule, the posterior distribution of the amplitude vector $a(\omega)$ can be obtained as $$a|y;\gamma,\Sigma_n,\sigma^2 : CN(u, \Sigma_a) \quad (29)$$

where the posterior mean u and the posterior covariance matrix $\Sigma_a$ are given by, respectively, $$u = \sigma^{-2} \Sigma_a \Phi^H y \quad (30)$$

$$\Sigma_a = (\sigma^{-2} \Phi^H \Phi + R^{-1})^{-1} \quad (31)$$

with R given by (26).

The optimal Bayesian minimum mean-square error (MMSE) estimate of the coefficient vector a can be obtained by minimizing the Bayesian MSE $$E(\|a-\hat{a}\|^2 | \gamma, \Sigma, \sigma^2)$$

$$= \iint \|a-\hat{a}\|^2 p(a, y|\gamma, \Sigma, \sigma^2) da dy. \quad (32)$$

Given the Gaussian posterior of a in (29) and conditioned on $\{\gamma, \Sigma_n, \sigma^2\}$, it is known that the Bayesian MMSE estimate of a coincides with the maximum a posteriori (MAP) estimate, and they both are equal to the posterior mean of a. From (30), the Bayesian MMSE estimate of a is given by $$\hat{a} = u = \sigma^{-2} \Sigma_a \Phi^H(\omega) y(\omega). \quad (33)$$

The block sparsity is enforced by pushing the hyperparameters $\{\gamma_n\}_{n=1}^N$ into zeros. As $\gamma_n \to 0$, from (26), the n-th diagonal block of R is equal to zero, i.e., $\gamma_n \Sigma_n = 0$, and the n-th block of a, i.e., $a_n$, approaches to zeros from (33). Therefore, the block sparsity of the amplitude vector is naturally transferred to the sparsity in the hyperparameters $\{\gamma_n\}_{n=1}^N$. Once the hyperparameters $\{\gamma_n\}_{n=1}^N$ are estimated, a can then be estimated from (33).

The above Bayesian MMSE estimate of a is based on the given hyperparameters $\{\gamma, \Sigma_n\}$ and the noise variance $\sigma^2$. In the following, the hyperparameters and the noise variance are estimated and updated from the type-II ML estimates by maximizing the marginal likelihood function of y with respect to $\{\gamma, \Sigma_n, \sigma^2\}$.

Give the signal model, the marginal likelihood function of y can be computed as $$p(y|\gamma, \Sigma, \sigma^2) = \int p(y|a, \sigma^2) p(a|\gamma, \Sigma) da \Rightarrow y|\gamma, \quad (34)$$

$$\Sigma, \sigma^2 : CN(0, \Sigma_y)$$

where $p(y|a,\sigma^2)$ and $p(a|\gamma,\Sigma)$ are given by (28) and (25), respectively, and $$\Sigma_y = \sigma^2 I_{LF} + \Phi R \Phi^H \quad (35)$$

$$= (\sigma^{-2} I_{LF} - \sigma^{-4} \Phi \Sigma_a \Phi^H)^{-1}.$$

Equivalently, the following cost function $L(\gamma, \Sigma_n, \sigma^2)$ can be minimized with respect to $\{\gamma, \Sigma_n, \sigma^2\}$ which is proportional to the negative logarithm of the marginal likelihood function in (34), $$L(\gamma, \Sigma_n, \sigma^2) = \ln|\Sigma_y| + y^H R_y^{-1} y \quad (36)$$

$$= LF \ln \sigma^2 + \ln|R| + \ln|\Sigma_a^{-1}| +$$

$$\sigma^{-2} y^H y - \sigma^{-4} y^H \Phi \Sigma_a \Phi^H y$$

where the second equation holds with the help of (35).

Unfortunately, a direct maximization of $L(\gamma, \Sigma_n, \sigma^2)$ with respect to $\{\gamma, \Sigma_n, \sigma^2\}$ yields no closed-form solution for the type-II ML estimation. Alternatively, iterative implementation may be used to estimate $\{\gamma, \Sigma_n, \sigma^2\}$. In the following, two strategies are considered for such updates: 1) the Fixed-Point (FP) algorithm; and 2) the Expectation-Maximization (EM) algorithm.

The FP algorithm simply takes the derivative of $L(\gamma, \Sigma_n, \sigma^2)$ with respect to $\{\gamma, \Sigma_n, \sigma^2\}$ and, then, forms a fixed-point equation by setting the derivatives to zeros.

The FP Iteration of $\gamma$: Starting from (36), initially the derivative of $L(\gamma, \Sigma_n, \sigma^2)$ is taken with respect to $\gamma_n$, i.e., the n-th element of $\gamma$, $$\frac{\partial L(\gamma, \Sigma_n, \sigma^2)}{\partial \gamma_n} = \frac{F}{\gamma_n} - \frac{tr\{\Sigma_a^{\{n\}} \Sigma_n^{-1}\}}{\gamma_n^2} - \frac{u_n^H \Sigma_n^{-1} u_n^H}{\gamma_n^2} \quad (37)$$

where $\Sigma_a^{\{n\}}$ denotes the n-th diagonal block of the posterior covariance matrix $\Sigma_a$ in (31), and $u_n$ denotes the n-th block of the posterior mean u in (30).

Setting the above derivative to zero, produces the fixed-point equation for $\gamma$ $$\hat{\gamma}_n = \frac{tr\{\Sigma_a^{\{n\}} \Sigma_n^{-1}\} + u_n^H \Sigma_n^{-1} u_n^H}{F}, n = 1, 2, \ldots, N. \quad (38)$$

From the above equation, it can be seen that the estimate of the n-th hyperparameter is given by the whitened posterior variance average over the F frequency points The FP Iteration of $\Sigma_n$: taking the derivative of $L(\gamma, \Sigma_n, \sigma^2)$ with respect to the (i,j)-th element of $\Sigma_n$, results in $$\frac{\partial L(\gamma, \Sigma, \sigma^2)}{\partial [\Sigma_n]_{ij}} = \quad (39)$$

$$\{\Sigma_n^{-1}\}_{ij} - \frac{\{\Sigma_n^{-1} \Sigma_a^{\{n\}} \Sigma_n^{-1}\}_{ij}}{\gamma_n} - \frac{\{\Sigma_n^{-1} u_n u_n^H \Sigma_n^{-1}\}_{ij}}{\gamma_n}$$

which results in $$\frac{\partial L(\gamma, \Sigma, \sigma^2)}{\partial \Sigma} = \sum_n^{-1} - \frac{\sum_n^{-1} \sum_a^{\{n\}} \sum_n^{-1}}{\gamma_n} - \frac{\sum_n^{-1} u_n u_n^H \sum_n^{-1}}{\gamma_n} \quad (40)$$

Setting the above derivative to zero, produces the fixed-point equation for $\Sigma_n$ $$\Sigma_n = \gamma_n^{-1}(\Sigma_a^{\{n\}} + u_n u_n^H). \quad (41)$$

From the above equation, it can be seen that the estimate of the structural covariance matrix is given by the posterior mean-squared error matrix.

The FP Iteration of $\sigma^2$: Similarly, taking the derivative of $L(\gamma, \Sigma_n, \sigma^2)$ with respect to $\sigma^2$, results in $$\frac{\partial L(\gamma, \Sigma, \sigma^2)}{\partial \sigma^2} = LF\sigma^{-2} - \sigma^{-2}tr\{I_{NF} - R^{-1}\Sigma_a\} - \sigma^{-4}\|y - \Phi u\|^2. \quad (42)$$

Setting the above derivative to zero, produces the fixed-point equation for $\sigma^2$ $$\hat{\sigma}^2 = \frac{\|y - \Phi u\|^2}{FL - \sum_{n=1}^{N}(F - \gamma_n^{-1}tr\{\Sigma_n^{-1}\Sigma_a^{\{n\}}\})}. \quad (43)$$

Therefore, the estimate of the noise variance is given by the residual energy normalized by a factor related to the whitened posterior covariance matrix.

To gain a fast convergence, defining a new quantity $$\zeta_n = F - \gamma_n^{-1}tr\{\Sigma_n^{-1}\Sigma_a^{\{n\}}\} \quad (44)$$

the FP iteration for $\{\gamma, \Sigma_n, \sigma^2\}$ can be rewritten as $$\hat{\gamma}_n^{new} = \frac{u_n^H \sum_n^{-1} u_n^H}{\zeta_n}, n = 1, 2, \ldots, N. \quad (45)$$

$$\sum_n^{new} = \gamma_n^{-1}(\sum_a^{\{n\}} + u_n u_n^H) \quad (46)$$

$$\hat{\sigma}_2^{new} = \frac{\|y - \Phi u\|^2}{FL - \sum_{n=1}^{N} \zeta_n}, \quad (47)$$

where $\zeta_n$, u and $\Sigma_a$ are obtained with $(\gamma)^{old}$, $(\Sigma)^{old}$, and $(\hat{\sigma}^2)^{old}$ in the previous iteration.

The EM algorithm, on the other hand, is an alternative to maximize the marginal likelihood function in (36) by treating a as the hidden (unobservable) variable. In particular, the EM algorithm is a two-step iterative algorithm by first, in the E-step, computing the expectation of log-likelihood of the complete data (the observation y and the hidden variable a), given the old parameter estimates and then, in the M-step, updating the estimates of unknown parameters by maximizing this expectation with respect to unknown parameters.

Define $\theta = [\gamma, \Sigma_n, \sigma^2]$. In the E-step, given the estimate of $\theta$ at the k-th iteration, i.e., $\theta^{(k)}$, the expectation of log-likelihood of the complete data, also referred to as the Q-function, is given as $$Q(\theta) = E_{a|y;\theta^{(k)}}\{\ln[p(a, y; \theta)]\} \quad (48)$$

$$= \int p(a|y; \theta^{(k)})\ln[p(y|a; \sigma^2)p(a; \gamma, \Sigma)]da$$

In the second M-step, the updated estimate of $\theta$ is obtained by maximizing the Q-function $$\theta^{(k+1)} = \underset{\theta}{\operatorname{argmax}} Q(\theta) \quad (49)$$

The EM Iteration of $\gamma$: From the above result, the EM update of $\gamma$ is given by $$\gamma^{(k+1)} = \underset{\gamma}{\operatorname{argmax}} \int p(a|y; \theta^{(k)})\ln[p(y|a; \sigma^2)p(a; \gamma, \Sigma)]da \quad (50)$$

$$= \underset{\gamma}{\operatorname{argmax}}\left[-\ln|\pi R| - tr\{R^{-1}\sum_a^{(k)}\} - (u^{(k)})^H R^{-1}u^{(k)}\right]$$

Taking the derivative of the above equation and setting to zero, produces the EM iteration of $\sigma$:

$$\gamma_n^{(k+1)} = \frac{tr\{\sum_a^{\{n\}}\sum_n^{-1}\} + u_n^H \sum_n^{-1} u_n^H}{F}, n = 1, 2, \ldots, N. \quad (51)$$

where u, $\Sigma_a$ and $\Sigma_n$ are all computed with the estimate of $\theta^{(k)} = \{\gamma^{(k)}, \Sigma_n^{(k)}, (\sigma^2)^{(k)}\}$ from the k-th iteration. Compared it with (41), it can be seen that the EM iteration of $\gamma$ is the same at the FP iteration of $\gamma$.

The EM Iteration of $\Sigma_n$: Similarly, the EM update of $\Sigma_n$ is given by $$\sum_n^{(k+1)} = \underset{\Sigma_n}{\operatorname{argmax}} \int p(a|y; \theta^{(k)})\ln[p(y|a; \sigma^2)p(a; \gamma, \Sigma_n)]da \quad (52)$$

$$= \gamma_n^{-1}(\sum_a^{\{n\}} + u_n u_n^H),$$

which, again, the same as the one used in the FP iteration.

The EM Iteration of $\sigma^2$: Based on the EM algorithm, we have $$(\sigma^2)^{(k+1)} = \underset{\sigma^2}{\operatorname{argmax}} \int p(a|y; \theta^{(k)})\ln[p(y|a; \sigma^2)p(a; \gamma, \Sigma_n)]da \quad (53)$$

$$= \underset{\sigma^2}{\operatorname{argmax}}\left[-LF\ln\sigma^2 - \sigma^{-2}(tr\{\Phi^H\Phi\sum_a^{(k)}\} + \|y - \Phi u^{(k)}\|^2)\right]$$

Taking the derivative of the above equation with respect to $\sigma^2$ and equating it to zero, we have the EM iteration of $\sigma^2$ $$(\sigma^2)^{(k+1)} = \frac{tr\{\Phi^H\Phi\sum_a^{(k)}\} + \|y - \Phi u^{(k)}\|^2}{LF}, \quad (54)$$

which appears to be different from the FP iteration of $\sigma^2$ in (43).

The overall SBL algorithm is obtained by alternating these two steps. With both the FP and EM iterations, the two SBL algorithms result, i.e., the Corr-SBL-FP and Corr-SBL-EM algorithm, for the broadband dispersion extraction for a chosen frequency band. Specifically, either SBL algorithm uses all measurements $y(\omega), \omega \in \Omega$, within the chosen frequency band and the pre-determined dictionaries $\Phi(\omega)$, $\omega \in \Omega$, as inputs, and deliveries the estimates of the amplitude vectors a and the noise variance $\hat{\sigma}^2$. Additional information about the prior variance $\gamma_i$, the posterior covariance matrix $\Sigma_{a(\omega)}$, and the marginal covariance matrix $\Sigma_{y(\omega)}$ of the measurement can be obtained as well.

For practical application, several comments on the estimation of the correlation matrices are in order. It is noted that it may cause over-fitting by using N correlation matrices $\{\Sigma_n\}_{n=1}^N$ for the block sparse signal model. Alternatively, one can use only one correlation matrix $\{\Sigma_n\}_{n=1}^N = \Sigma$ to avoid the over-fitting. However, simulation results show that this usually leads to the suppression of weak modes. This is due to the fact that, by using only one correlation matrix, the learned correlation matrix appears to converge to the correlation matrix of the strongest mode. Therefore, one embodiment takes a hybrid approach for the iterative Corr-SBL methods. At the early stage of iteration, a single structured/unstructured correlation matrix is learned at each iteration by averaging over the N estimated $\{\Sigma_n\}_{n=1}^N$ in the Corr-SBL methods. When the number of active basis (say K) is less than F (the number of frequency measurements), K correlation matrices are simultaneously learned by imposing them to be Toeplitz, i.e., $$\hat{\Sigma}_k^{Toeplitz} = \begin{bmatrix} 1 & \rho_k & \cdots & \rho_k^{F-1} \\ \rho_k & 1 & \cdots & \rho_k^{F-2} \\ \vdots & \vdots & \ddots & \vdots \\ \rho_k^{F-1} & \rho_k^{F-2} & \cdots & 1 \end{bmatrix}, \quad (55)$$

$$k = 1, 2, \ldots, K \leq F \ll N$$

where $\rho_k = d_1/d_0$ with $d_1$ and $d_0$ given by the sum of diagonal entries and the main sub-diagonal entries of $\Sigma_k$ obtained in the Corr-SBL methods. Other physics-driven correlation matrix can be similarly used.

The detailed algorithms for the Corr-SBL-FP and Corr-SBL-EM iterations can be found in Tables 1 and 2, respectively. In the performance evaluation, the threshold $\epsilon$ for the pruning step is set to be, e.g., $\epsilon = 1 \times 10^{-6}$. The convergence is claimed if the maximum number of iterations is met or the maximum change of prior variances from one iteration to the next is below a threshold. The maximum allowable change of the marginal likelihood function $L(\gamma, \sigma^2)$ between two consecutive iterations can also be used for the convergence condition.

TABLE 1

The Broadband Corr-SLB-FP Algorithm

Inputs: y, $\Phi$;
Outputs: a, $\hat{\sigma}^2$;
Initialization: $\gamma^{(0)} = 1_N$, $\Sigma^{(0)} = I_F$, $(\sigma^2)^{(0)} = 1$;
Repeat:
$R^{(k)} = \text{diag}(\gamma^{(k)}) \otimes \Sigma^{(k)}$;
$\Sigma_a = (\Phi^H \Phi/(\sigma^2)^{(k)} + (R^{(k)})^{-1})^{-1}$;
$u = \Sigma_a \Phi^H y/(\sigma^2)^{(k)}$;
$\zeta_n = F - \text{tr}\{(\Sigma^{(k)})^{-1} \Sigma_a\}/\gamma_n^{(k)}$;

TABLE 1-continued

The Broadband Corr-SLB-FP Algorithm $$\gamma_n^{(k+1)} = \frac{u_n^H (\Sigma^{(k)})^{-1} u_n^H}{\zeta_n}, \quad n = 1, 2, \ldots, N;$$

$$\Sigma^{(k+1)} = \frac{\sum_{n=1}^N (\Sigma_a^{[n]} + u_n u_n^H)/\gamma_n^{(k)}}{N};$$

$$(\sigma^2)^{(k+1)} = \frac{\|y - \Phi u\|^2}{FL - \sum_{n=1}^N \zeta_n};$$

Remove F columns of $\Phi$ with indices between $(n - 1) \times F + 1$ and $n \times F$, if corresponding $\gamma_n \leq \epsilon$;
Until (convergence)
a = u;
$\hat{\sigma}^2 = (\sigma^2)^{(k)}$;

TABLE 2

The Broadband Corr-SLB-EM Algorithm

Inputs: y, $\Phi$
Outputs: a, $\hat{\sigma}^2$;
Initialization: $\gamma^{(0)} = 1_N$, $\Sigma^{(0)} = I_F$, $(\sigma^2)^{(0)} = 1$;
Repeat:
$R^{(k)} = \text{diag}(\gamma^{(k)}) \otimes \Sigma^{(k)}$;
$\Sigma_a = (\Phi^H \Phi/(\sigma^2)^{(k)} + (R^{(k)})^{-1})^{-1}$;
$u = \Sigma_a \Phi^H y/(\sigma^2)^{(k)}$;
$\zeta_n = F - \text{tr}\{(\Sigma^{(k)})^{-1} \Sigma_a\}/\gamma_n^{(k)}$;

$$\gamma_n^{(k+1)} = \frac{u_n^H (\Sigma^{(k)})^{-1} u_n^H}{\zeta_n}, \quad n = 1, 2, \ldots, N;$$

$$\Sigma^{(k+1)} = \frac{\sum_{n=1}^N (\Sigma_a^{[n]} + u_n u_n^H)/\gamma_n^{(k)}}{N};$$

$$(\sigma^2)^{(k+1)} = \frac{\|y - \Phi u\|^2}{FL - \sum_{n=1}^N \zeta_n};$$

Remove F columns of $\Phi$ with indices between $(n - 1) \times F + 1$ and $n \times F$, if corresponding $\gamma_n \leq \epsilon$;
Until (convergence)
a = u;
$\hat{\sigma}^2 = (\sigma^2)^{(k)}$;

If the mode spectrum correlation is not considered, the correlation matrix can simply be imposed to be an identity matrix, i.e., $\Sigma_n = I$. In this case, the learning step of $\Sigma$ in the Corr-SBL method can be skipped and, by exploiting the multiple measurement structure, the implementation of the broadband SBL method can be further simplified from the LF×NF dimension to the L×N dimension. As a result, the broadband SBL method can be operated in a much faster way than the Corr-SBL method, which may be favored in applications where the computational efficiency is a high priority.

Correspondingly, the FP and EM iterations for updating the hyperparameters and the noise variance are employed for the broadband SBL method. Specifically, the SBL-FP method is summarized in the following two steps:

1. The MMSE Estimate of $a(\omega)$:

$$a(\omega)=(\Phi^H(\omega)\Phi(\omega)+\sigma^2\Gamma^{-1})^{-1}\Phi^H(\omega)y(\omega), \omega\in\Omega, \quad (56)$$

2. The FP Iteration of $(\gamma,\sigma^2)$:

$$\hat{\gamma}_i^{new} = \frac{\sum_{f=1}^{F}|u_i(\omega_f)|^2}{\sum_{\omega_f}\zeta_i(\omega_f)} \quad (57)$$

$$(\hat{\sigma}^2)^{new} = \frac{\sum_{f=1}^{F}\|y(\omega_f)-\Phi(\omega_f)u(\omega_f)\|^2}{FL-\sum_{f=1}^{F}\sum_{i=1}^{N}\zeta_i(\omega_f)}. \quad (58)$$

where $$u(\omega)=\sigma^{-2}\Sigma_{a(\omega)}\Phi^H(\omega)y(\omega), \quad (59)$$

$$\Sigma_{a(\omega)}=(\sigma^{-2}\Phi^H(\omega)\Phi(\omega)+\Gamma^{-1})^{-1}, \quad (60)$$

$$\zeta_i(\omega)=1-\gamma_i^{-1}\Sigma_{a(\omega)}^{ii}, \quad (61)$$

are computed with $\gamma^{old}$ and $(\hat{\sigma}^2)^{old}$ from the previous iteration.

Similarly, the SBL-EM method is implemented as follows:

1. The MMSE Estimate of $a(\omega)$:

$$a(\omega)=(\Phi^H(\omega)\Phi(\omega)+\sigma^2\Gamma^{-1})^{-1}\Phi^H(\omega)y(\omega), \omega\in\Omega, \quad (62)$$

2. The EM Iteration of $(\gamma,\sigma^2)$:

$$(\gamma^i)^{new} = \frac{\sum_f\left(\Sigma_{a(\omega_f)}^{ii}+|u_i(\omega_f)|^2\right)}{F}, \quad (63)$$

$$(\sigma^2)^{new} = \frac{\sum_f\left[(\sigma^2)^{old}\sum_{i=1}^{N}\zeta_i(\omega_f)+\|y(\omega)-\Phi(\omega_f)u(\omega_f)\|^2\right]}{FL}. \quad (64)$$

The above procedure is only for dispersion extraction for a given frequency band. For a global dispersion extraction of borehole acoustic modes, the measurements need to be separated into successive blocks and the SBL algorithm applied to each block. Let $Y_B=[y(\omega_1),y(\omega_2),\ldots,y(\omega_{N_F})]$ represent the frequency-domain measurement over a large frequency range of interest, where $N_F$ is the total number of measurements. The matrix $Y_B$ is then divided into consecutive blocks with individual length $F_d$, where $d=1,2,\ldots,D$ with D denoting the number of blocks over the frequency range $[\omega_1,\omega_{N_F}]$.

Figure 5:
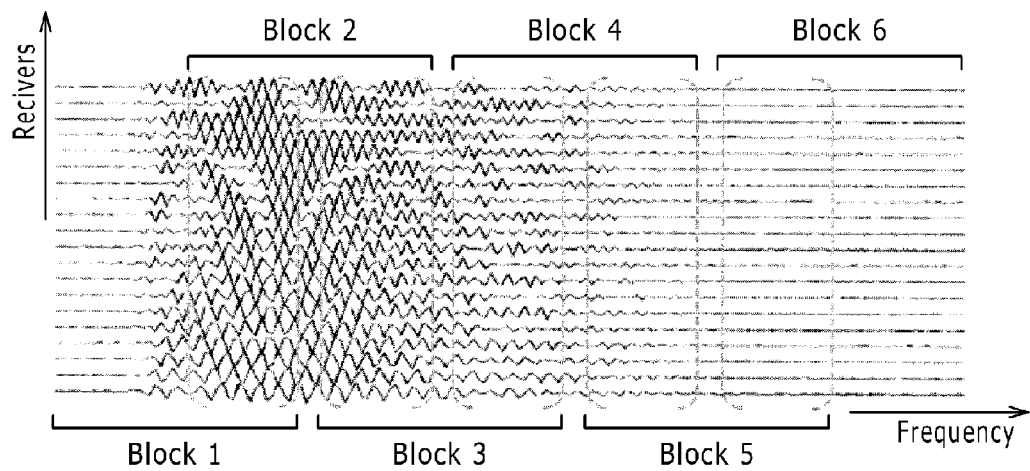
FIG. 5 is a graphic illustration of dividing the space-frequency data into successive blocks.

Assuming $\eta_{d+1}\in[0,1)$ is the overlapping ratio between the d-th and (d+1)-th blocks, the number of overlapping measurements is $N_s=\lfloor\eta_{d+1}F_{d+1}\rfloor$, where $d=1,2,\ldots,D-1$. In the case of non-overlapping blocks with equal length, $\{\eta_d\}_{d=1}^{D-1}=0$, $\{F_d\}_{d=1}^{D}=F$, and $D=\lceil N_F/F\rceil$. The divided blocks are then denoted as $\{Y_d\}_{d=1}^{D}\in\mathbb{C}^{L\times F_d}$. An illustration of the block separation is given in FIG. 5, where the array data in the frequency domain are divided into several overlapping blocks with equal length. The overlapping data between two consecutive blocks are denoted by dashed brackets.

In the following, two workflow procedures are elaborated, i.e., the global workflow and the local workflow, in order to extract the dispersion of borehole acoustic modes over the whole frequency range of interest.

In some embodiments the global workflow may be used if the non-overlapping ratio $\eta$ is relatively small and the computational complexity is a higher priority. In this scenario, a suggestion is to first construct the local fitness function over each block and overlying the local fitness functions of two consecutive blocks on the overlapping portion for a global fitness function. The global fitness function displays the estimated mode spectrum amplitude over the slowness-frequency domain and provides a qualitative assessment on the dispersion extraction. For a quantitative dispersion extraction, one can simply apply a standard peak finding over the global fitness function and obtain the slowness estimation over various acoustic modes.

Figure 6A:
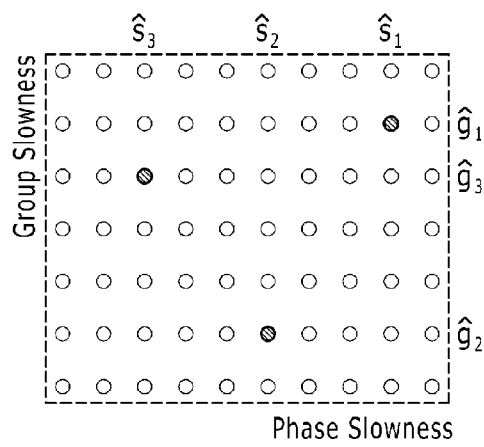
FIG. 6A is the recovered phase and group slowness pairs from an algorithm of the current disclosure.
Figure 6B:
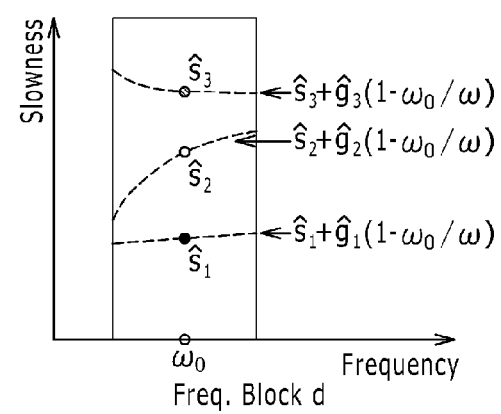
FIG. 6B is a graphic illustration of the construction of the local fitness function according to an algorithm of an embodiment of the current disclosure.

One step is the construction of the local fitness function over each block based on the estimated phase and group slowness pairs. The non-zero rows are located in the estimated amplitude matrix A, the corresponding phase and group slowness pairs are obtained, see FIG. 7B. For example, if the norm of the n-th row of A is greater than zero, the corresponding phase and group slowness pair $(\hat{s}_i,\hat{g}_j)$ are given by (15). Then we map the n-th coordinate pair $(\hat{s}_i,\hat{g}_j)$ back to a dispersion curve $\hat{s}_n(\omega)$ in the slowness-frequency domain with the help of $$\hat{s}_n(\omega)=\hat{s}_i+\hat{g}_j(1-\omega_0/\omega), \omega\in\Omega. \quad (65)$$

which is the same as (5) but with the estimated $(\hat{s}_i,\hat{g}_j)$. As illustrated in FIG. 6B, the coordinates of active bases are projected back to different dispersion trajectories in the slowness-frequency domain based on the relationship in (65). Finally, the magnitude of the n-th row of A is used as the spectrum intensity along the dispersion trajectories.

Figure 8:
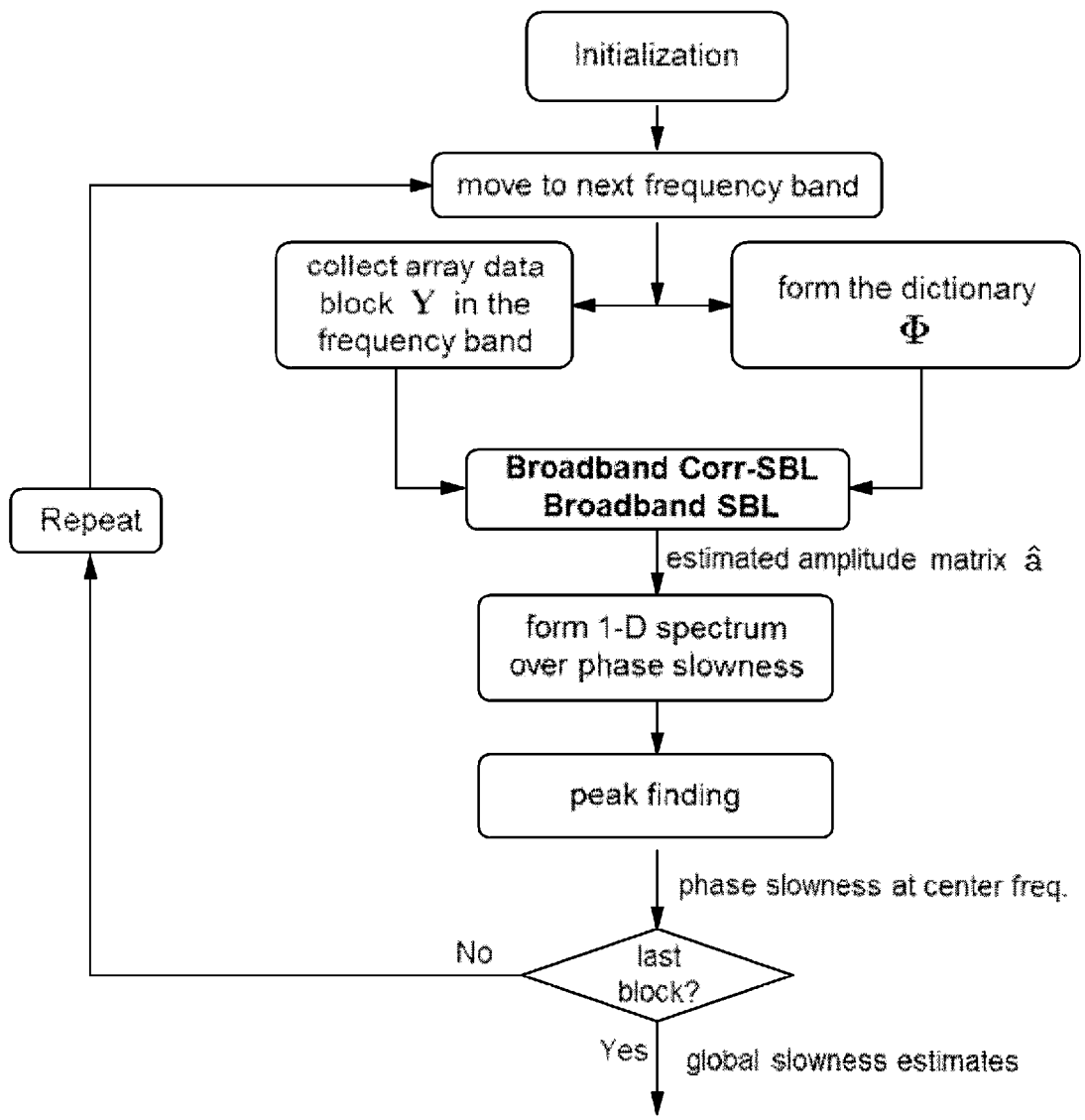
FIG. 8 is a flowchart of a local workflow for a method for broadband dispersion extraction, according to an embodiment of the current disclosure.

The global workflow of the SBL method for broadband dispersion extraction is summarized in FIG. 8. The initialization step refers to the selection of algorithm parameters including the number of measurement vectors in one block $\{F_d\}_{d=1}^{D}$, the overlapping ratio $\{\eta_d\}_{d=1}^{D-1}$, and the number of peaks P. Once they are determined, the measurement matrices $Y_d$, $d=1,2,\ldots,D$, can be determined. Another algorithm parameter is the number of peaks P used in the peak finding algorithm.

In other embodiments, the local workflow may be used if the data blocks are highly overlapped. Compared to the global workflow which uses both the recovered phase and group slownesses, the local workflow relies more heavily on the recovered phase slowness. This is due to the observation that the estimate of group slowness is less accurate than the phase slowness estimate, by inspecting the experimental results as well as the theoretical Cramér-Rao bound. Therefore, for each frequency band, the local workflow explicitly obtains a quantitative estimate of the phase slowness at the center frequency. By stacking the estimated phase slowness at center frequency of each frequency band together, a global estimate of slowness can be obtained.

The local estimate of phase slowness at the center frequency can be obtained in many ways. For instance, in some embodiments a two-dimensional peak find (or clustering) algorithm can be employed on the recovered A with a preset number of peaks. However, other embodiments may first form a one-dimensional amplitude spectrum over the phase slowness and then apply a one-dimensional peak finding algorithm. The one-dimensional spectrum over the phase slowness is achieved by the following step $$A(s_i) = \sum_{j=1}^{N_g} \|A^{(i-1)N_g+j}\|_2 \qquad (66)$$

where $A^n$ denotes the n-th row of A and P·$P_2$ is the Euclidean norm of a vector. The above step essentially obtains the recovered energy for each pair of $(s_i, g_j)$ by computing the Euclidean norm of each row and then, for a given $s_i$, sums the energy along the group slowness ($g_j$) domain. Applying the one-dimensional peak finding algorithm to the one-dimensional spectrum $A(s_i)$ gives the estimates of the phase slowness at the center frequency of this frequency band.

Figure 7:
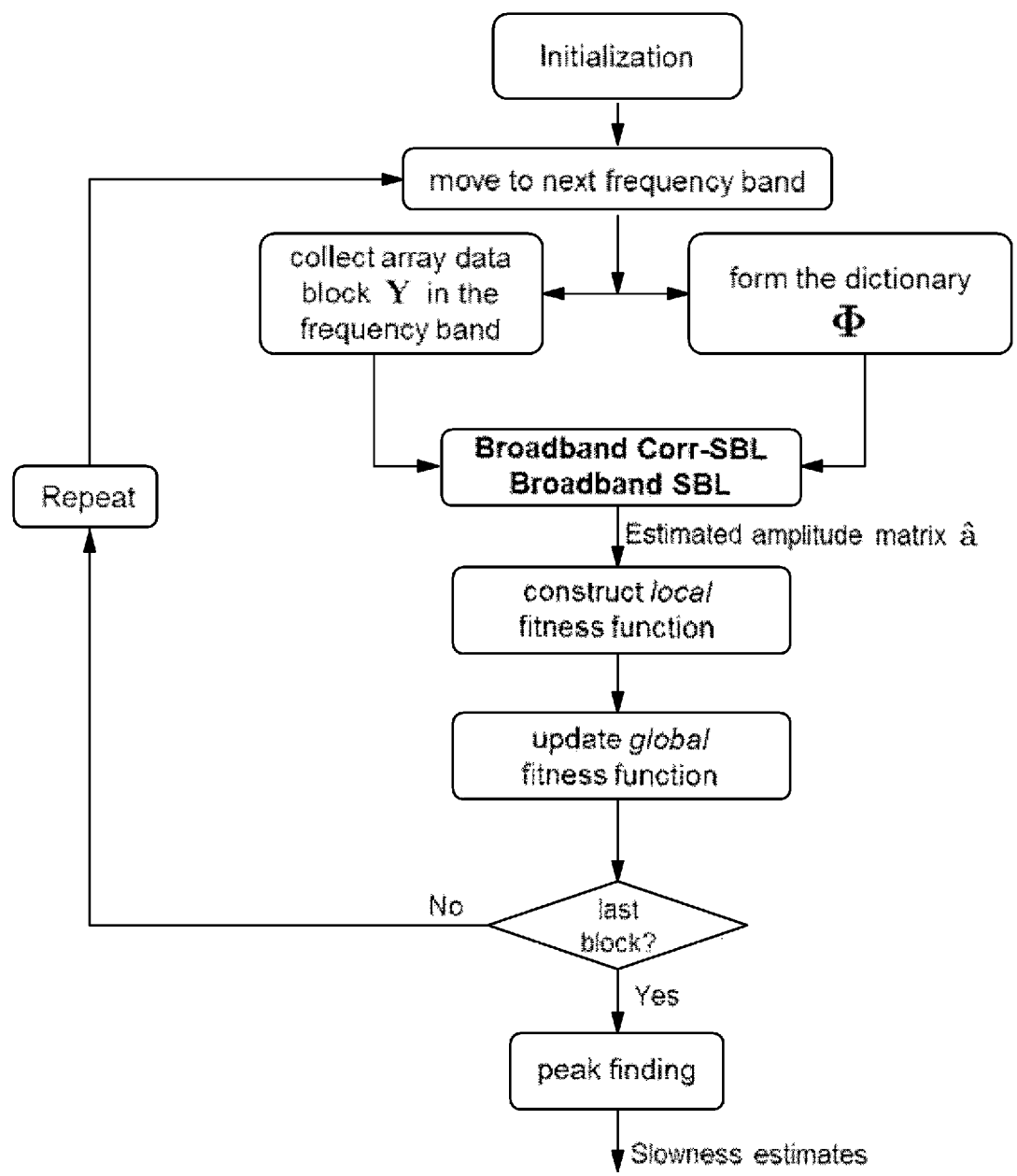
FIG. 7 is a flowchart of a global workflow for a method for broadband dispersion extraction, according to an embodiment of the current disclosure.

The local workflow of the SBL method is summarized in FIG. 7. The initialization is similar to the global workflow by configuring the algorithm parameters. One difference between the global and local workflow is whether the peak finding algorithm is used within each frequency band or over the whole frequency range.

In this section, simulation results are presented to verify the effectiveness of embodiments of the proposed SBL and Corr-SBL methods for dispersion extraction of borehole acoustic modes. The performance is numerically evaluated by using one synthetic dataset and one field dataset. For each dataset, we compare the proposed SBL method with the industry benchmark matrix-pencil (MP) method and the broadband LASSO method with the KS test (referred to as the LASSO-KS method).

Figure 9A:
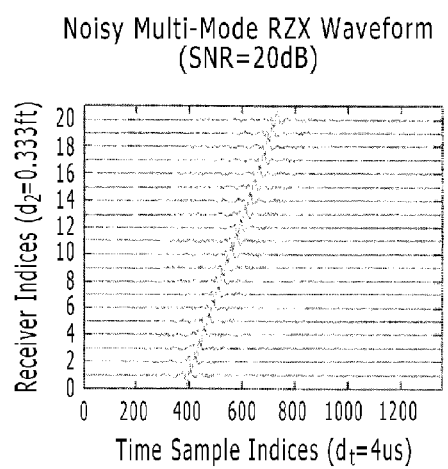
FIGS. 9A & 9B are graphic representations of time domain waveforms and frequency spectra for synthetic data when the Signal to Noise Ratio (SNR) is 20 dB.
Figure 9B:
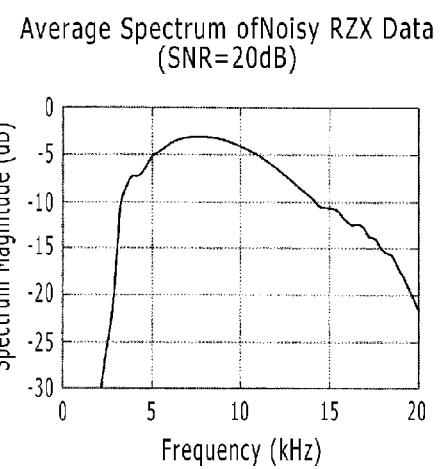

In one example, synthetic data are generated according to a semi-analytic method. The dataset contains a simulated array data with L=20 receivers. The synthetic waveforms and spectra with SNR=20 dB are shown in FIGS. 9A and 9B. The SNR is defined as the ratio of the total signal energy to the total noise energy over the whole frequency band.

Figure 10A:
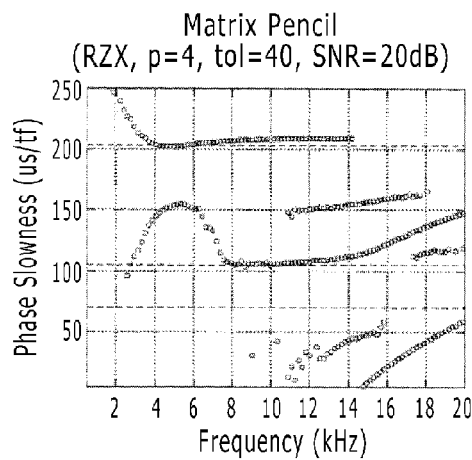
FIG. 10A is a graphic representation of phase slowness vs. frequency by the MP method (noise free)
Figure 10B:
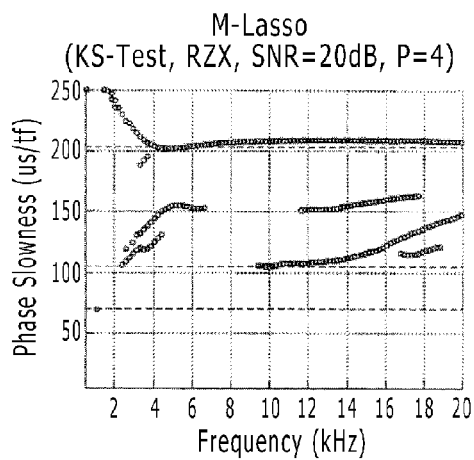
FIG. 10B is a graphic representation of phase slowness vs. frequency by the LASSO-KS method.
Figure 10C:
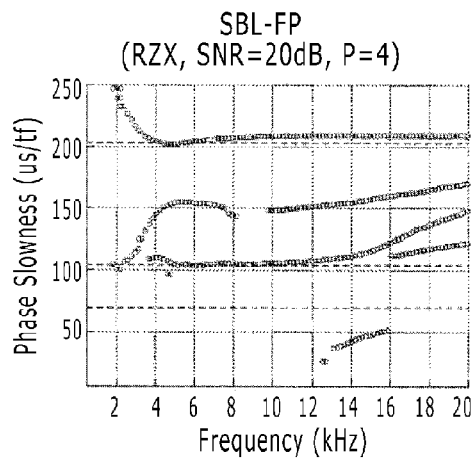
FIG. 10C is a graphic representation of phase slowness vs. frequency by global estimates.
Figure 10D:
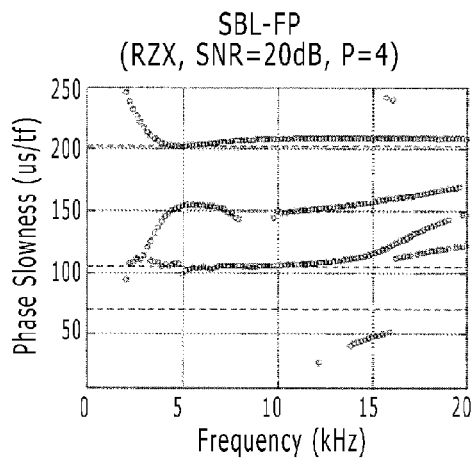
FIG. 10D is a graphic representation of phase slowness vs. frequency by local estimates.
Figure 10E:
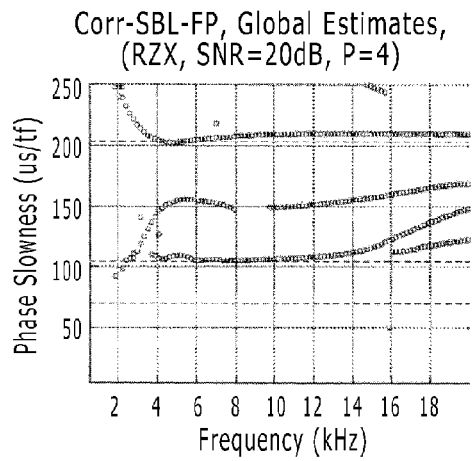
FIG. 10E is a graphic representation of phase slowness vs. frequency by Corr-FP by global estimates, according to an embodiment of the current disclosure.
Figure 10F:
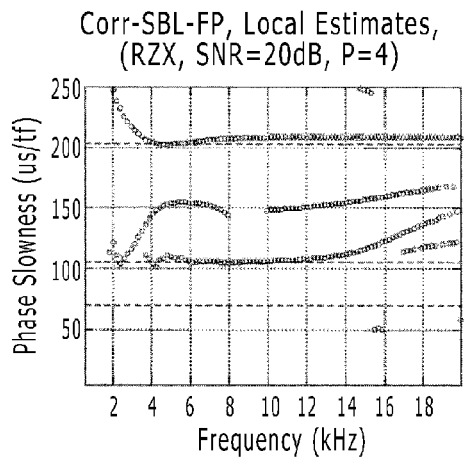
FIG. 10F is a graphic representation of phase slowness vs. Frequency by Corr-FP by local estimates, according to an embodiment of the current disclosure.

In FIG. 10A, the MP method is applied to the noisy synthetic RZX data with a preset mode number P=4 and a tolerance level tol=40%. It may be seen from FIG. 10A that the MP method can estimate the slowness for stronger modes but is unable to deliver the slowness estimates when the signal energy is small. For example, the slownesses of the flexural mode when the frequency is less than 2.5 kHz and when the frequency is in between than 6 kHz and 11 kHz cannot be extracted. Also, the low-frequency ([3,8] kHz) asymptotic of the higher-order flexural mode is not shown in FIG. 10A. At the same time, spurious slowness estimates due to the noise contribution can be observed in the frequency band between 6 kHz and 8 kHz. The performance of the LASSO-KS method is shown in FIG. 10B. It is seen that the slowness estimates of the flexural mode and the higher-order flexural mode at low frequency region are not well preserved. FIGS. 10C and 10D give the slowness estimates by the proposed SBL-FP method together with the global and local workflow procedures with a preset mode number P=4, respectively, while FIGS. 10E and 10F show the slowness estimates by the broadband Corr-SBL methods with the two workflows (The SBL-EM method gives similar performance with more computation time and, hence, it is skipped here.). The algorithm parameters for the SBL-FP method include $\{F_d\}_{d=1}^D=7$ (i.e., the data blocks have the same length) and a uniform overlapping ratio $\{\eta_d\}_{d=1}^{D-1}=0.8333$. These parameters give the bandwidth of each frequency band $2\omega_B=1.1070$ kHz since the frequency resolution for this dataset is $\Delta f=0.1845$ kHz. The results from the global and local workflow procedures are similar; i.e., a better capability to estimate the slowness for the flexural mode at a large frequency range, the full recovery of the low-frequency slowness of the higher-order flexural mode, robustness against the spurious estimates, and the smooth dispersion extraction with less variation of the slowness estimates. Moreover, the extracted slownesses of the flexural mode and higher-order flexural mode at the low frequency range agree well with the true shear slowness around 105 us/ft.

Figure 11A:
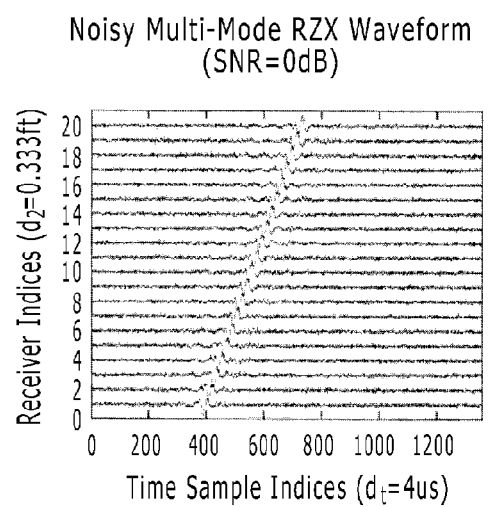
FIGS. 11A & 11B are graphic representations of time domain waveforms and frequency spectra for synthetic data when the SNR is 0 dB.
Figure 11B:
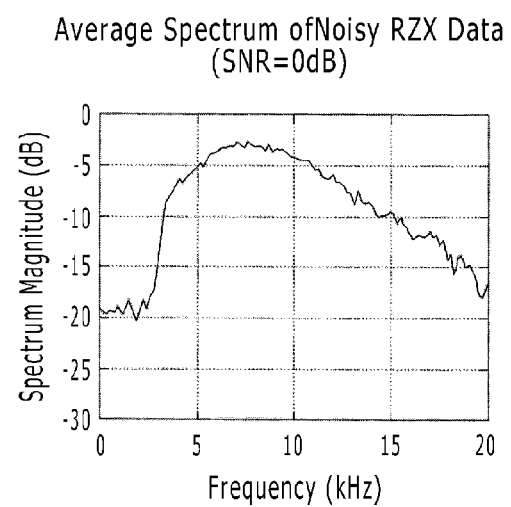
Figure 12A:
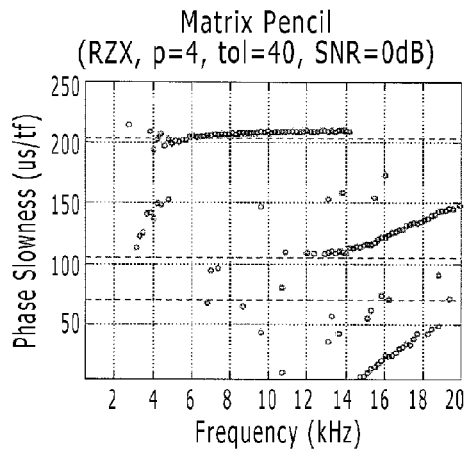
FIG. 12A is a graphic representation of phase slowness vs. frequency by the MP method (noise free)
Figure 12B:
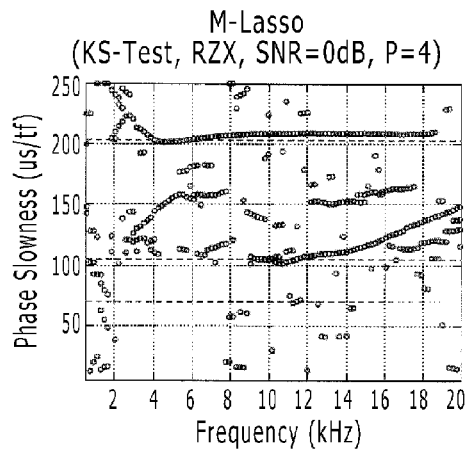
FIG. 12B is a graphic representation of phase slowness vs. frequency by the LASSO-KS method.
Figure 12C:
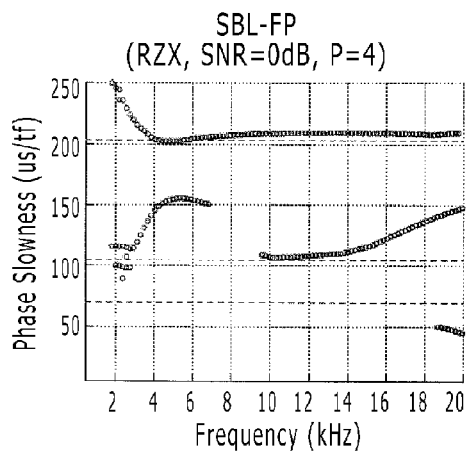
FIG. 12C is a graphic representation of phase slowness vs. frequency by global estimates.
Figure 12D:
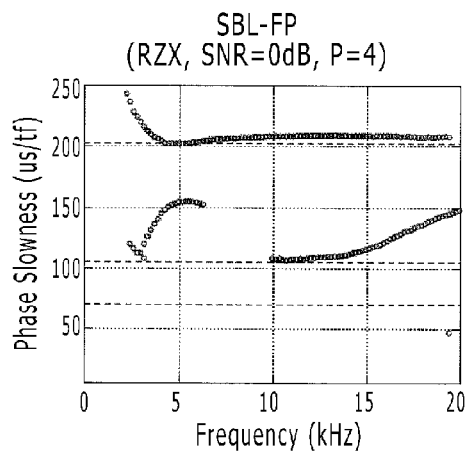
FIG. 12D is a graphic representation of phase slowness vs. frequency by local estimates.
Figure 12E:
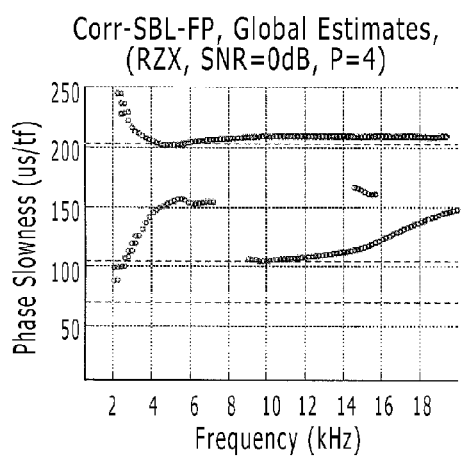
FIG. 12E is a graphic representation of phase slowness vs. frequency by Corr-FP by global estimates, according to an embodiment of the current disclosure.
Figure 12F:
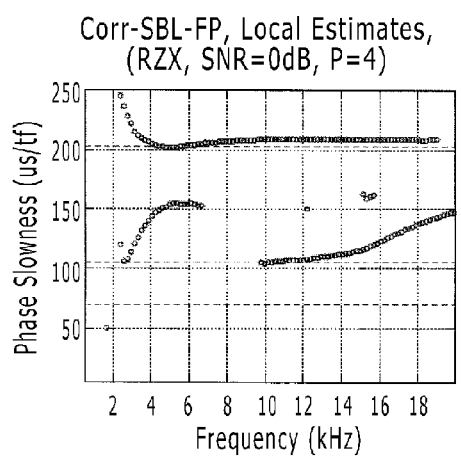
FIG. 12F is a graphic representation of phase slowness vs. frequency by Corr-FP by local estimates, according to an embodiment of the current disclosure.

In yet another example, a more noisy scenario is considered in order to test the robustness of embodiments of the evaluated methods. FIGS. 11A and 11B show the waveforms and the spectra of the synthetic dataset when SNR=0 dB. As shown in FIG. 12A, the performance degradation of the MP method can be seen. In this strong noise case, the MP method almost fails to identify the entire flexural mode and only presents scattered slowness estimates at the frequency range from 3 kHz to 5 kHz. Similar effects can be observed for the higher-order flexural mode. With SNR=0 dB, the LASSO-KS method shown in FIG. 12B suffers from dense spurious estimates when the preset mode number is still set to P=4, which smears the estimates of the true modes. The performance degradation of the LASSO-KS method is largely contributed to the incorrect determination of the regularization parameter from the KS test which may not be robust in low SNR case. In comparison, embodiments of the proposed SBL and Corr-SBL methods with P=4, shown in FIGS. 12C-12F, provide relatively cleaner dispersion extraction with the ability to estimate the flexural mode with a larger frequency range and less variation. It may be observed that in the strong noise case, the local workflow may be able to provide some spurious estimates of slowness around the shear slowness at 105 us/ft in FIG. 12C that may not be observed with the global workflow. This may be attributed to the reduced accuracy of the group slowness estimate based on the global workflow at low SNR, while the local workflow only uses the phase slowness at the center frequency for the dispersion estimation.

Figure 13A:
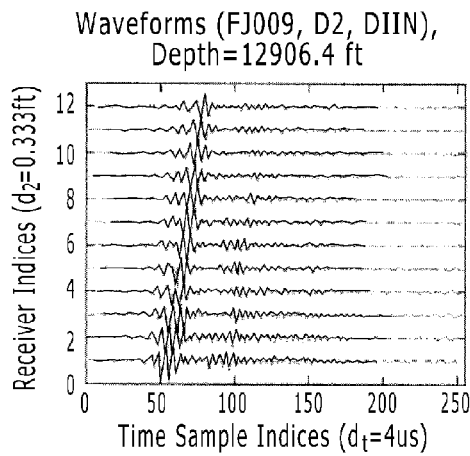
FIG. 13A is a graphic representation of sample dipole waveforms acquired with a Logging While Drilling (LWD) tool.
Figure 13B:
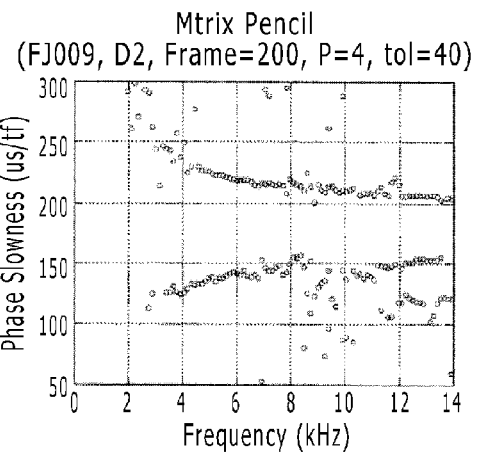
FIG. 13B is a graphic representation of phase slowness vs. frequency by the MP method.
Figure 13C:
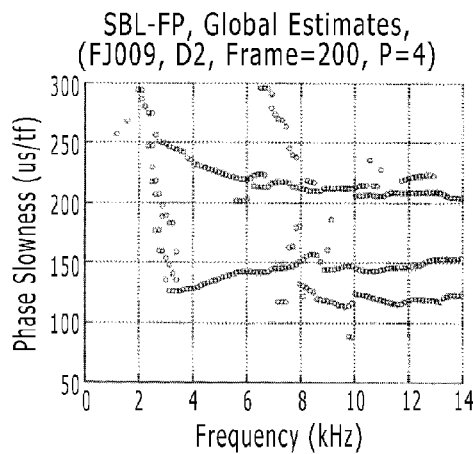
FIG. 13C is a graphic representation of phase slowness vs. frequency by global estimates.
Figure 13D:
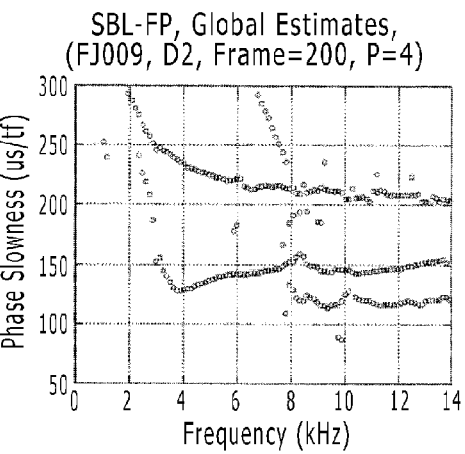
FIG. 13D is a graphic representation of phase slowness vs. frequency by local estimates.
Figure 13E:
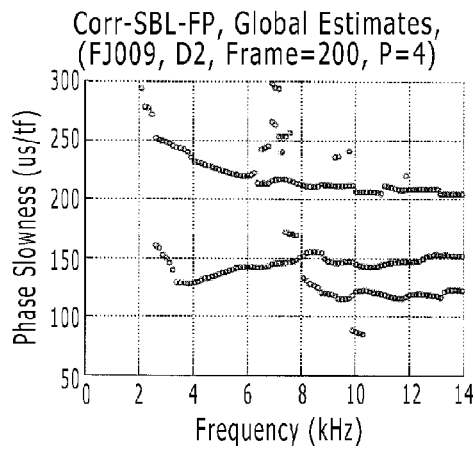
FIG. 13E is a graphic representation of phase slowness vs. frequency by Corr-FP by global estimates, according to an embodiment of the current disclosure.
Figure 13F:
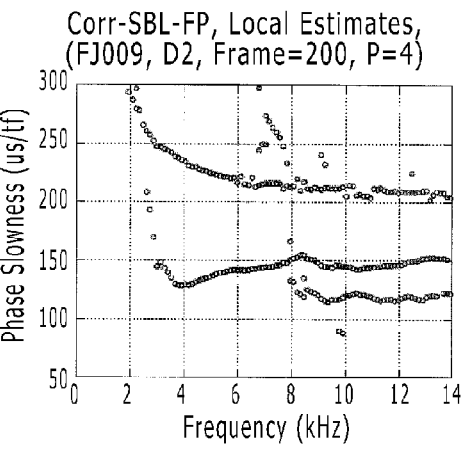
FIG. 13F is a graphic representation of phase slowness vs. frequency by Corr-FP by local estimates, according to an embodiment of the current disclosure.

In yet another example, embodiments of this disclosure are presented with the dispersion extraction results from a frame of field data obtained with a logging while drilling (LWD) sonic tool. As shown in FIG. 13A, the LWD dipole waveforms were recorded from 12 receivers.

The MP method with P=4 and tol=40% is first applied to the dipole waveforms and the result is shown in FIG. 13A. As shown in FIG. 13A, the extracted slowness estimates are scattered at the low frequency region, and the identification of the high-order flexural model may appear to be difficult. For embodiments of the proposed SBL-FP method, the algorithm parameters are set to $\{F_d\}_{d=1}^D=9$, $\{\eta_d\}_{d=1}^{D-1}=0.8889$ and P=2. These parameters result in the bandwidth of each frequency band $2\omega_B=1.0417$ kHz. FIGS. 13C-13F show the dispersion extraction by the SBL and Corr-SBL methods with the global and local workflow procedures, respectively. Compared with the MP method, the SBL and Corr-SBL methods provide more robust slowness estimates of the three acoustic modes (tool flexural, formation flexural, and high-order flexural modes) with less fluctuation from one frequency to another. Particularly, embodiments of the SBL and Corr-SBL methods provide relatively improved slowness estimates at low frequency points for both the tool and formation flexural modes. Moreover, embodiments of the SBL and Corr-SBL methods provide additional slowness estimates corresponding to reflector sources.

Elements of the embodiments have been introduced with either the articles "a" or "an." The articles are intended to mean that there are one or more of the elements. The terms "including" and "having" are intended to be inclusive such that there may be additional elements other than the elements listed. The term "or" when used with a list of at least two elements is intended to mean any element or combination of elements.

In view of the above description it will be appreciated that features of the invention may be implemented in computer programs stored on a computer readable medium and run by processors, application specific integrated circuits and other hardware. Moreover, the computer programs and hardware may be distributed across devices including but not limited to tooling which is inserted into the borehole and equipment which is located at the surface, whether onsite or elsewhere.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. An apparatus that extracts slowness dispersion characteristics of one or more sonic wave forms in broadband acoustic waves received by an array of two or more sensors positioned with respect to a reservoir, the apparatus comprising:
    a circuit that digitizes the sonic wave forms to form discrete time wave forms and converts the discrete time wave forms into frequency domain wave forms data;
    a circuit that divides a processing band of the frequency domain wave forms data into frequency sub-bands data;
    one or more processors that, for each sub-band:
        approximate a family of candidate dispersion curves for multiple modes;
        parameterize each of the family of approximated candidate dispersion curves by phase and group slowness;
        form a frequency dependent over-complete dictionary of basis elements, each corresponding to a pair of phase and group slownesses, and spanning a range of values thereof;
        form multiple measurement vectors from the frequency domain wave forms data;
        implement a sparse Bayesian learning (SBL) algorithm on the multiple measurement vectors with a block sparse signal model by:
            estimation of a mode spectrum amplitude with a Bayesian approach;
            estimation of a mode spectrum variance, noise variance and other model parameters with a maximum likelihood estimation;
            assessment of presence of spectrum correlation patterns of multiple modes in the frequency domain wave forms data based in part on an estimation of covariance therein;
            prune mode candidates based at least in part on the assessment and by comparison of the estimated mode parameters with a threshold;
            iteration between the Bayesian approach and the maximum likelihood estimation until convergence according to a criterion; and
            output the phase and group slowness and the mode spectrum amplitude for a given sub-band; and that
        generate a final dispersion curve over the processing band; and
    characterize the reservoir based at least in part on the final dispersion curve.

2. The apparatus according to claim 1, wherein; the Bayesian minimum mean square estimation and/or the Bayesian maximum a posteriori estimation is implemented during the broadband SBL algorithm.

3. The apparatus according to claim 1, wherein; the maximum marginal likelihood estimation or the Type-II maximum likelihood estimation is implemented during the broadband SBL algorithm.

4. The apparatus according to claim 1, wherein; the broadband SBL algorithm uses a fixed-point (FP) algorithm.

5. The apparatus according to claim 1, wherein; the broadband SBL algorithm uses an Expectation-Maximization (EM) algorithm.

6. The apparatus according to claim 1, wherein; the assessment of presence of spectrum correlation in the SBL algorithm is achieved by a means of joint Gaussian distributions and/or conditional stochastic distributions.

7. The apparatus according to claim 6, wherein; the conditional stochastic distributions include a conditional uniform distribution and a truncated Gaussian distribution.

8. The apparatus according to claim 1, wherein: the broadband SBL algorithm uses a global workflow and a peak estimating function applied over each frequency band.

9. The apparatus according to claim 1, wherein: the broadband SBL algorithm uses a local workflow and a peak estimating function applied over a whole frequency range.

10. The apparatus according to claim 1, wherein: the broadband SBL algorithm uses a correlation matrix structure for the parameter estimation.

11. The apparatus according to claim 10, wherein: the correlation matrix structure includes a Hermitian, Toeplitz, persymmetric, band-limited structures.

12. The apparatus according to claim 1, wherein: the prune is implemented at least in part by thresholdation that outs the modes with estimated variances and/or amplitudes of less than a certain value.

13. A method for extracting slowness dispersion characteristics of one or more sonic wave forms in broadband acoustic waves received by an array of two or more sensors positioned with respect to a reservoir, the method comprising:
    digitizing the sonic wave forms to form discrete time wave forms and converting the discrete time wave forms into frequency domain wave forms;
    dividing a processing band of the frequency domain wave forms into frequency sub-bands; and
    for each sub-band:
        approximating a family of candidate dispersion curves for multiple modes;
        parameterizing each of the family of approximated candidate dispersion curves by phase and group slowness;

forming a frequency dependent over-complete dictionary of basis elements, each corresponding to a pair of phase and group slownesses, and spanning a range of values thereof;

forming multiple measurement vectors from the frequency domain data;

via one or more processors, implementing a sparse Bayesian learning (SBL) algorithm on the multiple measurement vectors with a block sparse signal model by:

estimating a mode spectrum amplitude with a Bayesian approach;

estimating a mode spectrum variance, noise variance and other model parameters with a maximum likelihood estimation;

assessing presence of spectrum correlation patterns of multiple modes;

pruning mode candidates by comparing the estimated mode parameters with a threshold;

iterating between the Bayesian approach and the maximum likelihood estimation until convergence according to a criterion; and outputting the phase and group slowness and the mode spectrum amplitude for a given sub-band; and generating a final dispersion curve over the processing band; and characterizing the reservoir based at least in part on the final dispersion curve.

* * * * *